US009207456B2

(12) United States Patent
Hiraide et al.

(10) Patent No.: US 9,207,456 B2
(45) Date of Patent: Dec. 8, 2015

(54) VIRTUAL IMAGE DISPLAY DEVICE

(71) Applicant: Seiko Epson Corporation, Tokyo (JP)

(72) Inventors: Noriaki Hiraide, Azumino (JP); Takeshi Fujishiro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 14/179,701

(22) Filed: Feb. 13, 2014

(65) Prior Publication Data
US 2014/0254024 A1 Sep. 11, 2014

(30) Foreign Application Priority Data

Mar. 11, 2013 (JP) ................. 2013-047618

(51) Int. Cl.
G02B 27/10 (2006.01)
G02B 27/01 (2006.01)
(52) U.S. Cl.
CPC ...... *G02B 27/0172* (2013.01); *G02B 2027/011* (2013.01); *G02B 2027/0127* (2013.01); *G02B 2027/0156* (2013.01); *G02B 2027/0178* (2013.01)
(58) Field of Classification Search
CPC ........... G02B 27/0176; G02B 27/0149; G02B 27/0172; G02B 2027/0178
See application file for complete search history.

(56) References Cited

U.S. PATENT DOCUMENTS

| 2006/0168859 | A1* | 8/2006 | Pombo et al. ............. 40/611.07 |
| 2010/0157433 | A1 | 6/2010 | Mukawa et al. |
| 2010/0321409 | A1 | 12/2010 | Komori et al. |

FOREIGN PATENT DOCUMENTS

| JP | 2010-145859 A | 7/2010 |
| JP | 2011-2753 A | 1/2011 |

* cited by examiner

*Primary Examiner* — David N Spector
(74) *Attorney, Agent, or Firm* — ALG Intellectual Property, LLC

(57) ABSTRACT

In a virtual image display device, since the frame section has the support section for detachably fixing the auxiliary mounting member, which is disposed adjacent to the optical members, on the observer side of the optical members, by providing a variety of functions such as an optical function to the auxiliary mounting member, the usefulness of the virtual image display device can be enhanced. Specifically, in the case of, for example, providing the auxiliary mounting member with a diopter correction function, it is possible for any observers with a variety of levels of vision to observe the image obtained by the video display element in a good condition without blur without using eyeglasses.

17 Claims, 11 Drawing Sheets

VIRTUAL IMAGE DISPLAY DEVICE

BACKGROUND

1. Technical Field

The present invention relates to a virtual image display device for presenting a video to an observer as a virtual image, and in particular to a virtual image display device suitable for a head-mounted display to be mounted on the head of the observer.

2. Related Art

There have been proposed a variety of systems as an optical system to be incorporated in the virtual image display device such as the head-mounted display (hereinafter also referred to as an HMD) to be mounted on the head of the observer (see, e.g., JP-A-2011-2753 (Document 1) and JP-A-2010-145859 (Document 2)).

Regarding the virtual image display device such as an HMD, it is desired that miniaturization and weight reduction are progressed and that a wider field angle is achieved without degrading the image quality. Further, in the case of covering the entire sight of the observer to make the state in which only the video light can be seen, the observer fails to understand the external state, and thus feels unsafe. By showing the external sight and the video superimposed with each other, a new usage such as virtual reality is rather generated. Therefore, there is desired a display, which displays the video light in a superimposed manner without hindering the external sight. Further, in order to improve the wearing feeling of the observer, and to improve the appearance shape, it is generally desired to approach the shape of a pair of glasses.

Taking the above circumstances into consideration, it is possible to configure the virtual image display device with, for example, a light guide device disposed in front of the eyes of the observer in a see-through manner to guide the video light from the image display element to the eyes of the observer via such a see-through type light guide device. In the virtual image display device of this kind, it is necessary to hold the light guide device in front of the eyes, and there is an example in which a pair of image display sections each including an image light generation device and a light guide plate are fixed to a coupling member, and the coupling member is fixed to the back of a frame similar to frames of a pair of glasses (see Document 1).

However, in the virtual image display device described in Document 1, no consideration is given to the observer wearing a pair of glasses. Specifically, it is not assumed that the pair of glasses are disposed between the light guide plate and the eyes, and there is a possibility that the light guide plate interferes with, for example, the lenses or the nose pad of the pair of glasses.

SUMMARY

An advantage of some aspects of the invention is to provide a virtual image display device easy to be worn also by an eyeglasses wearer.

A virtual image display device according to an aspect of the invention includes a video element, an optical member adapted to direct light from the video element toward an eye of an observer to make an image be recognized, and a frame section adapted to support the video element and the optical member so that the optical member is disposed in front of the eye of the observer, and the frame section includes a support section adapted to detachably fix an auxiliary mounting member to be disposed on the observer side of the optical member.

According to the virtual image display device described above, since the frame section includes the support section for detachably fixing the auxiliary mounting member disposed on the observer side of the optical member, by providing the auxiliary mounting member with a variety of functions such as an optical function, usefulness of the virtual image display device can be enhanced. Specifically, in the case of, for example, providing the auxiliary mounting member with a diopter correction function or a vision correction function, it is possible for any observers with a variety of levels of vision to observe the image obtained by the video element in a good condition without blur without using eyeglasses.

According to a specific aspect of the invention, in the virtual image display device described above, the auxiliary mounting member is disposed on the observer side of the optical member so as to be adjacent to the optical member. In this case, the total thickness of the optical member and the auxiliary mounting member can be reduced, and it becomes easy to set the optical member closer to the eye of the observer.

According to another specific aspect of the invention, in the virtual image display device of the above aspect of the invention, the auxiliary mounting member includes an inner frame corresponding to a contour of the optical member. Here, the inner frame is not limited to a full-rim type, but can also be a half-rim type (Nylor) or an under-rim type (inverted Nylor). In this case, the inner frame can be disposed so as to hide behind the optical member, and thus the inner frame can be made inconspicuous in appearance. Further, by providing the light transmissive member fixed to the replaceable inner frame with a variety of optical functions such as a vision correction function or a diopter adjustment function, the optical function can easily be switched. It should be noted that the inner frame is not an essential constituent, and it is also possible to provide a hole to the optical member, and directly fix the optical member to the coupling section supported by the support section with a screw or the like. Further, it is also possible to make the support section directly support the optical member so that the optical member can detachably be attached.

According to another specific aspect of the invention, in the virtual image display device of the above aspect of the invention, the auxiliary mounting member includes a vision corrective lens fixed to the inner frame. In this case, an in-focus and sharp image can be observed due to the vision correction.

According to still another specific aspect of the invention, in the virtual image display device of the above aspect of the invention, the support section is disposed in a central portion of the frame section in a lateral direction, and is capable of supporting a central portion of the auxiliary mounting member. In this case, the auxiliary mounting member can easily be balanced when supporting the auxiliary mounting member, and therefore, the auxiliary mounting member can surely be supported by a simple support section.

According to still another specific aspect of the invention, in the virtual image display device of the above aspect of the invention, the auxiliary mounting member includes an inner frame having an eyeglasses outer shape having a pair of rim sections each having a ring-like shape and connected to each other by a bridge section, and the support section supports a coupling section provided to the bridge section. In this case, the coupling section to be supported by the support section can be provided using the bridge section of the inner frame.

According to still another specific aspect of the invention, in the virtual image display device of the above aspect of the invention, the support section includes a pair of spaces to which a pair of projections extending from the bridge section are inserted, and a pair of recessed sections to which claws disposed respectively at tips of the pair of projections are fitted. In this case, it becomes possible to attach and detach the auxiliary mounting member or the inner frame using a simple mechanism of snap-fit type.

According to still another specific aspect of the invention, in the virtual image display device of the above aspect of the invention, the support section is disposed in a space corresponding to an upper part of a nose. In this case, a structure of suspending the auxiliary mounting member can be adopted, and it is easy to stabilize the support of the auxiliary mounting member.

According to still another specific aspect of the invention, in the virtual image display device of the above aspect of the invention, the frame section includes a frame adapted to support the optical member, and a protector fixed to the frame, and adapted to protect at least a part of a peripheral portion of the optical member. In this case, it is possible to protect the optical member so as to surround the periphery of the optical member using the frame and the protector, and thus, the durability with respect to a strong impact from random directions as in the case of dropping the virtual image display device can be enhanced.

According to still another specific aspect of the invention, in the virtual image display device of the above aspect of the invention, the support section is formed in a connection area between the frame and the protector. In this case, the space for forming the support section is easily ensured, and further, the support section thus formed can be made inconspicuous.

According to still another specific aspect of the invention, in the virtual image display device of the above aspect of the invention, the frame includes a front section extending linearly, and the protector is disposed below the frame across the optical member, and includes a connection section in a central portion, the connection section having an inverted V shape and being connected to a central portion of the front section. In this case, an inverted triangular corner section is formed between the inverted V shaped connection section and the front portion of the frame, and the corner section can be used as the support section.

According to still another specific aspect of the invention, in the virtual image display device of the above aspect of the invention, the frame section forms an inner space used for disposing eyeglasses instead of the auxiliary mounting member in amounting state. In the case in which the auxiliary mounting member is not used, the observer wearing eyeglasses can wear the virtual image display device so as to cover the eyeglasses, and thus, observe the image obtained by the video element in a good condition without blur.

According to still another specific aspect of the invention, the virtual image display device of the above aspect of the invention further includes a pair of temple sections extending from the frame section, and supported by ears, and a nose support section having contact with a nose to support the frame section. In this case, the frame section is supported by the temple sections and the nose support section in front of the eye of the observer, and it results that the virtual image display device takes a configuration extremely similar to eyeglasses.

According to still another specific aspect of the invention, in the virtual image display device of the above aspect of the invention, the support section detachably fixes a cover member adapted to cover an outside of the optical member. In this case, it is possible to provide the cover member with functions such as a shade, and the use of the virtual image display device can be made more comfortable in accordance with the environment and so on.

According to still another specific aspect of the invention, in the virtual image display device of the above aspect of the invention, the optical member includes a light guide device having an optical block shape or a prismatic shape having a light permeability adapted to guide video light from a video display element as the video element to the eye of the observer while internally reflecting the video light. In this case, it is possible to form an intermediate image in the light guide device to observe the video, and the freedom of arrangement of the video display element and so on can be enhanced while avoiding the growth in size of the video display element and so on.

According to still another specific aspect of the invention, in the virtual image display device of the above aspect of the invention, the light guide device includes a light guide member adapted to guide the video light, and enable see-through of external light, and a light transmissive member connected to the light guide member, and adapted to assist a see-through function for the external light. In this case, since the light guide device can be made to have a shape similar to a lens section of eyeglasses, a good eyesight can be obtained, and the freedom of appearance can also be enhanced.

According to still another specific aspect of the invention, in the virtual image display device of the above aspect of the invention, the video element emits signal light scanned two-dimensionally, and the optical member reflects the light from the video display element to guide the light to the eye of the observer.

BRIEF DESCRIPTION OF THE DRAWINGS

The invention will be described with reference to the accompanying drawings, wherein like numbers reference like elements.

FIGS. 8A through 8D are diagrams for explaining a positional relationship among a nose support section, a protector, an auxiliary mounting member, and so on, wherein FIGS. 8B through 8D are diagrams for conceptually explaining the CC cross-section, the DD cross-section, and the EE cross-section in a central portion shown in FIG. 8A.

DESCRIPTION OF AN EXEMPLARY EMBODIMENT

Embodiment

Hereinafter, a virtual image display device according to an embodiment of the invention will be explained in detail with reference to FIG. 1 and so on.

Figure 1:
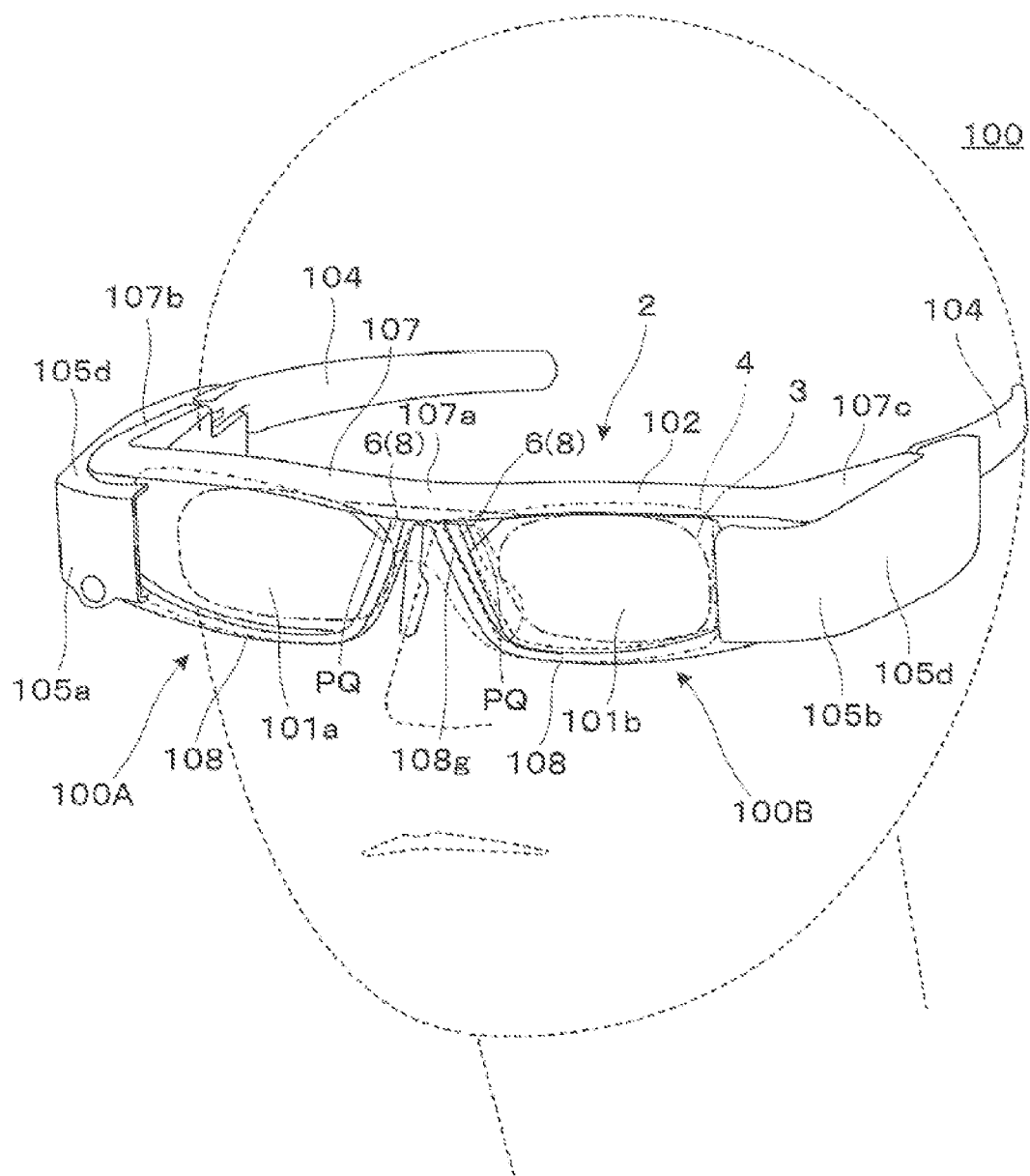
FIG. 1 is a perspective view for explaining an appearance of a virtual image display device according to an embodiment of the invention.

As shown in FIG. 1, the virtual image display device 100 according to the present embodiment is a head-mounted display having an exterior appearance like a pair of glasses, and is capable of allowing an observer or a user wearing the virtual image display device 100 to visually recognize image light of a virtual image, and at the same time, allowing the observer to visually recognize or observe the external image in a see-through manner.

The virtual image display device 100 is provided with a main body 2 constituting a principal appearance, an auxiliary mounting member 3 disposed on the reverse side of the main body 2, and a cover member 4 disposed on the obverse side of the main body 2. Among these constituents, the main body 2 is a part provided with optical elements essential for the virtual image display device 100, and the auxiliary mounting member 3 and the cover member 4 indicated by imaginary lines are provided to the main body 2 as arbitrary accessories so as to be able to arbitrarily be attached and detached.

The main body 2 of the virtual image display device 100 is provided with first and second optical members 101a, 101b for covering the front of the eyes of the observer in a see-through manner, a frame section 102 for supporting both of the optical members 101a, 101b, and first and second image forming main body sections 105a, 105b added to portions extending from both of the right and left ends of the frame section 102 to temple sections 104 located in the rear portions, respectively. Here, a first display device 100A obtained by combining the first optical member 101a and the first image forming main body section 105a located on the left side of the drawing is a part for forming a virtual image for the right eye, and functions alone as a virtual image display device. Further, a second display device 100B obtained by combining the second optical member 101b and the second image forming main body section 105b located on the right side of the drawing is a part for forming a virtual image for the left eye, and functions alone as a virtual image display device.

Figure 2A:
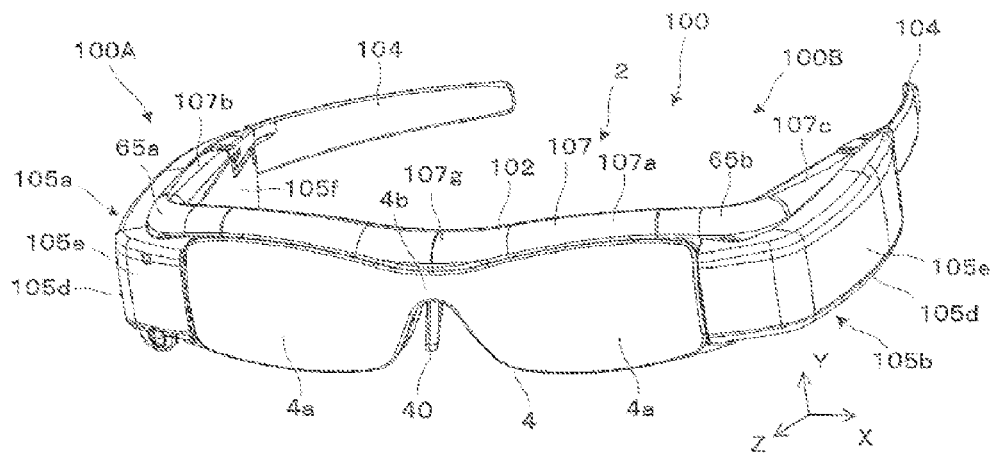
FIG. 2A is a perspective view of an obverse side showing the whole of the virtual image display device.
Figure 2B:
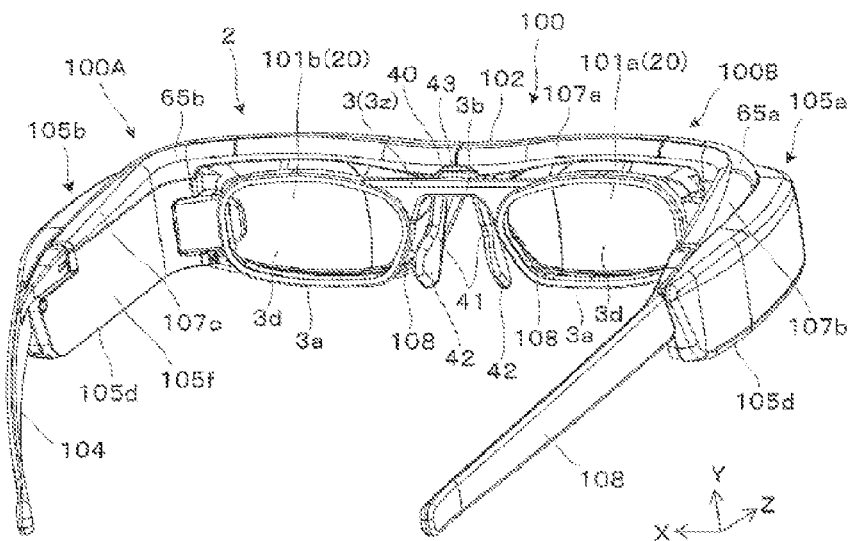
FIG. 2B is a perspective view of a reverse side showing the whole of the virtual image display device.
Figure 2C:
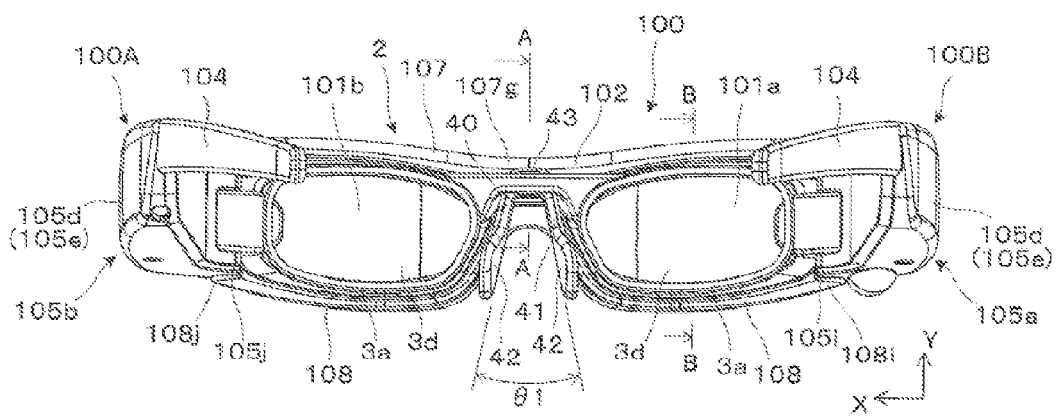
FIG. 2C is a rear view of the virtual image display device.
Figure 3A:
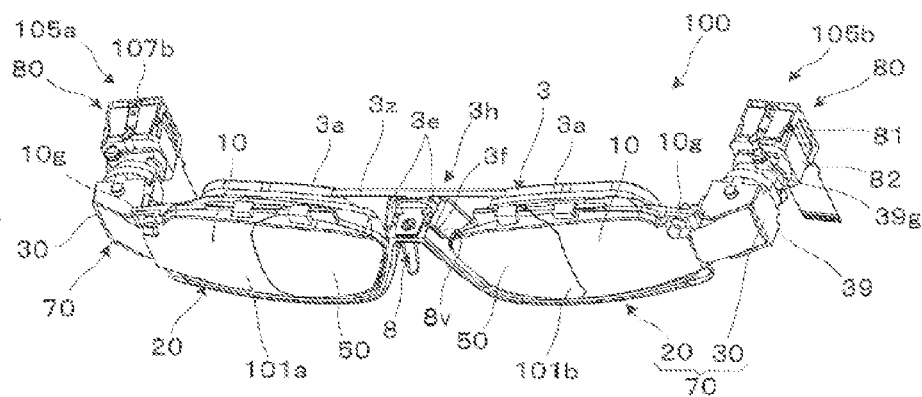
FIGS. 3A and 3B are a partial exploded perspective view and a partial exploded front view of the obverse side of the virtual image display device, respectively.
Figure 3B:
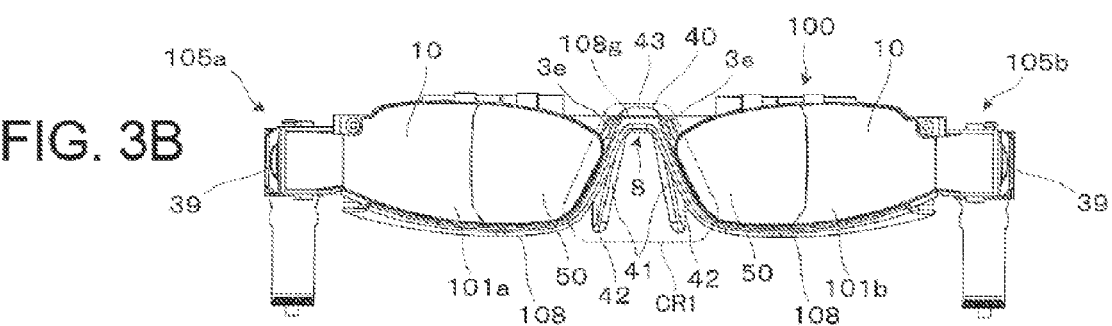
Figure 3C:
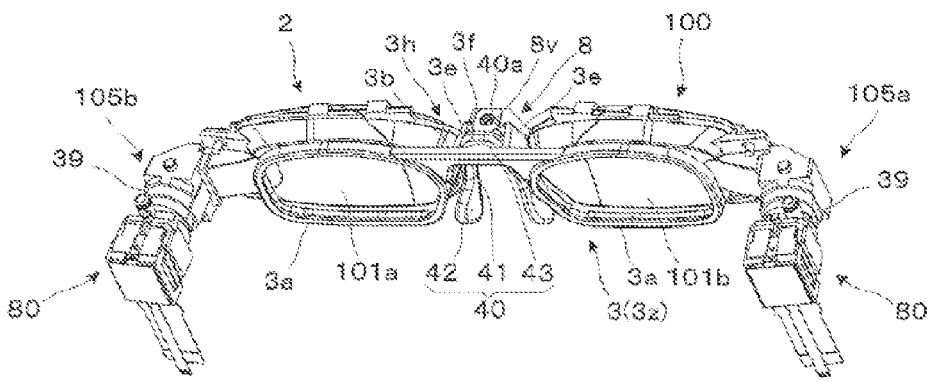
FIGS. 3C and 3D are a partial exploded perspective view and a partial exploded rear view of the reverse side of the virtual image display device, respectively.
Figure 3D:
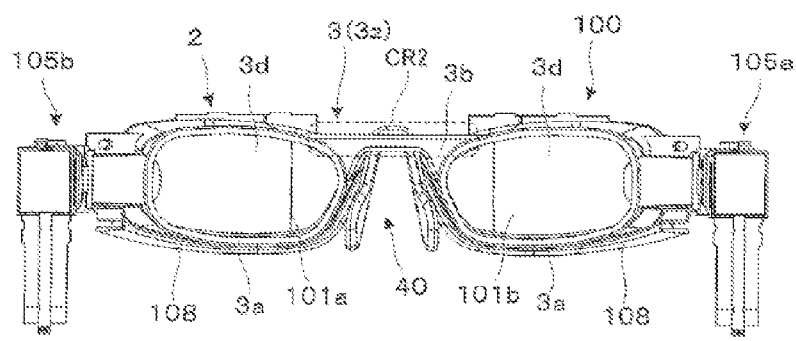
Figure 4:
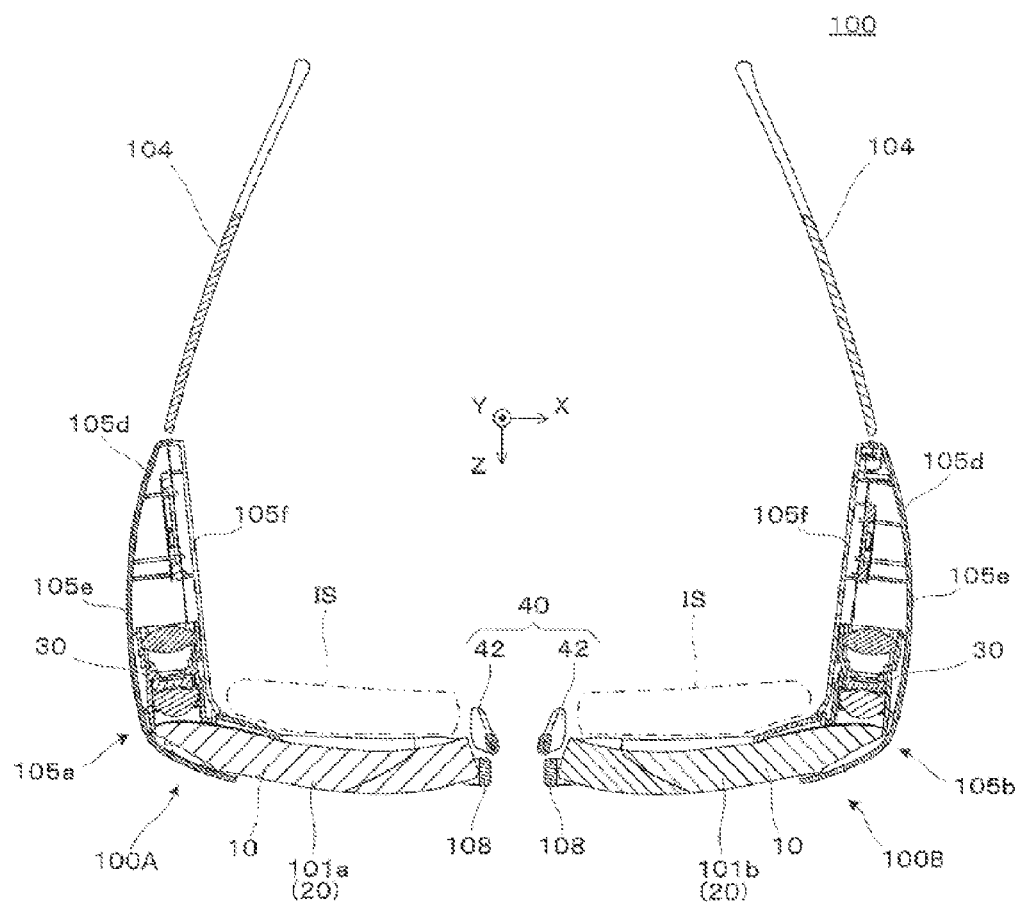
FIG. 4 is a planar cross-sectional view for explaining the virtual image display device in the state in which an auxiliary mounting member and so on are removed.

FIG. 2A is a perspective view for explaining an appearance of the obverse side of the virtual image display device 100, FIG. 2B is a perspective view for explaining an appearance of the reverse side of the virtual image display device 100, and FIG. 2C is a rear view of the virtual image display device 100. FIGS. 3A and 3B are a perspective view and a front view, respectively, showing the obverse side of the virtual image display device 100 in a partially exploded manner, and FIGS. 3C and 3D are an exploded perspective view and a rear view, respectively, showing the reverse side of the virtual image display device 100 in a partially exploded manner. FIG. 4 is a cross-sectional view of the virtual image display device 100 in a planar view.

As shown in the drawings, the frame section 102 provided to the main body 2 of the virtual image display device 100 is provided with a frame 107 as a beam section disposed on an upper side, and a protector 108 disposed on a lower side. In the frame section 102, the frame 107 on the upper side shown in FIG. 2A and so on is a member having an elongated plate-like shape folded to have a U shape in the X-Z plane, and is provided with a front section 107a extending in a lateral direction (the X direction) from right to left, and a pair of side surface sections 107b, 107c each extending in a depth direction (the Z direction) from front to rear. The frame 107, which is composed of the front section 107a, and the side surface sections 107b, 107c, is an integrated component made of metal formed of any of a variety of metal materials such as an aluminum die-casting material. The width in the depth direction (the Z direction) of the front section 107a is made sufficiently larger than the thickness or the width of a light guide device 20 corresponding to each of the first and second optical members 101a, 101b. The first optical member 101a and the first image forming main body section 105a are aligned and supported by being directly fixed by screwing on the left side of the frame 107, specifically in a side end portion 65a, which is a portion extending from the left end portion of the front section 107a viewed from the front of the drawing, to the side surface section 107b. Further, the second optical member 101b and the second image forming main body section 105b are aligned and supported by being directly fixed by screwing on the right side of the frame 107, specifically in a side end portion 65b, which is a portion extending from the right end portion of the front section 107a viewed from the front of the drawing, to the side surface section 107c. It should be noted that the first optical member 101a and the first image forming main body section 105a are aligned with each other by fitting, and the second optical member 101b and the second image forming main body section 105b are aligned with each other by fitting.

The protector 108 shown in FIG. 2C and so on is a member having an under-rim shape, and is disposed and fixed below the frame 107. A central portion CR1 (see FIG. 3B) of the protector 108 has a connection section 108g located in a connection area to be fixed to a central portion 107g (see, e.g., FIG. 2A) of the frame 107 by fitting or screwing. The protector 108 is a member having an elongated plate shape folded to have a double crank shape, and is formed integrally of a metal material or a resin material. Since the connection section (the connection area) 108g of the protector 108 has an inverted V-shaped outer shape, a pair of inverted triangular corner sections 6 are formed between the connection section 108g and the front section 107a of the frame 107 (see FIG. 1). Although described later in detail, the corner sections 6 each can be used as a support section 8 for fixing the auxiliary mounting member 3 and the cover member 4 so as to be able to detachably be attached. The width in the depth direction (the Z direction) of the protector 108 is roughly equal to the thickness or the width of the light guide device 20. A first tip portion 108i of the protector 108 is fixed to the first image forming main body section 105a by fitting, and a second tip portion 108j of the protector 108 is fixed to the second image forming main body section 105b by fitting. More specifically, as shown in FIG. 2C, the first tip portion 108i of the protector 108 is fixed in a state of being fitted into a recessed section 105i provided to an outer member 105e of an exterior member 105d shaped like a cover for covering the first image forming main body section 105a. Further, the second tip portion 108j of the protector 108 is fixed in a state of being fitted into a recessed section 105j provided to an outer member 105e of an exterior member 105d shaped like a cover for covering the second image forming main body section 105b.

The frame 107 has a role of not only supporting the first and second image forming main body sections 105a, 105b, but also protecting the inside of the first and second image forming main body sections 105a, 105b in cooperation with the exterior members 105d. The frame 107 also has a role of protecting upper side portions of the first and second optical members 101a, 101b or the light guide devices 20 to be connected to the first and second image forming main body sections 105a, 105b. The protector 108 has a role of protecting lateral side portions and a lower side portion of each of the optical members 101a, 101b or the light guide devices 20. Specifically, the protector 108 protects inner lateral side portions near to the nose and a lower side portion on the lower side of a peripheral portion A0 of a root portion (or an oval portion shown in FIG. 5, or the light guide device 20) of each of the optical members 101a, 101b from a variety of surrounding objects existing in the usage environment. In other words, if the frame 107 and the protector 108 have sufficient strength, even in the case in which, for example, the virtual image display device 100 collides with other objects in the periphery, it is possible to reduce the possibility of generating a damage or a displacement in the first and second image forming main body sections 105a, 105b and the first and second optical members 101a, 101b, in particular in the light guide devices 20 which are exposed. Further, it is possible to improve the durability of the virtual image display device 100 also against a high impact from a random direction as in the case of dropping the virtual image display device 100.

The protector 108 is separated from or has loose contact with the peripheral portion A0 having an oval shape of the light guide device 20 except the root side, which is connected to the first and second image forming main body sections 105a, 105b. It should be noted that the peripheral portion A0 of the light guide device 20 is also separated from or has loose contact with the front section 107a of the frame (the beam section) 107. As described above, in the peripheral portion A0 having a C shape except the root side, the first and second optical members 101a, 101b or the light guide devices 20 are close to the frame 107 and the protector 108, but are not fixed to the frame 107 or the protector 108. Therefore, even in the case in which there is a difference in coefficient of thermal expansion between the light guide devices 20 located at the central portions and the frame section 102 including the frame 107 and the protector 108, the expansion of the light guide devices 20 in the frame section 102 is allowed, and thus, the distortion, deformation, and damage can be prevented from occurring in the light guide devices 20.

Figure 5:
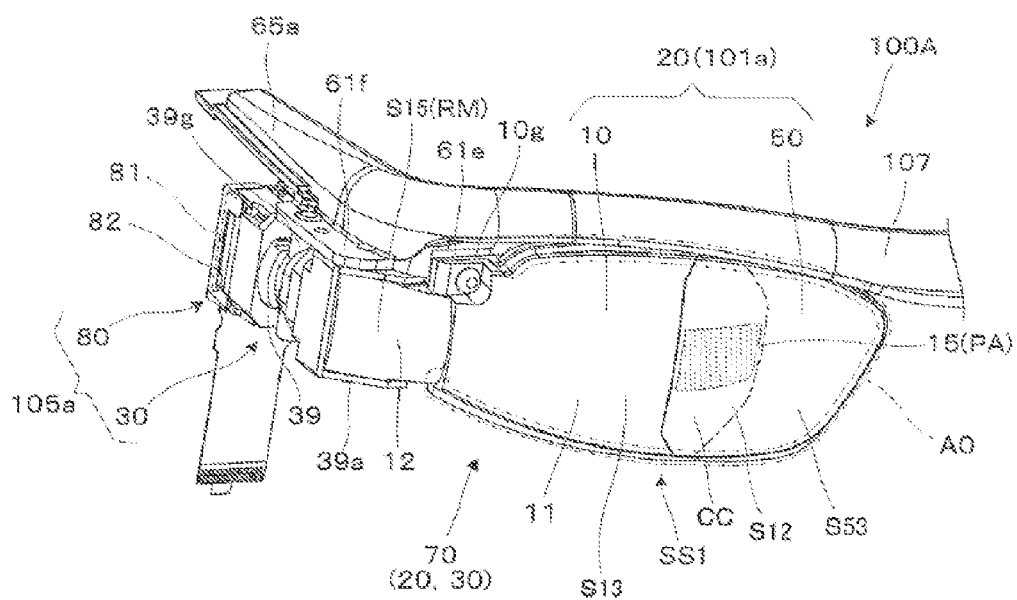
FIG. 5 is a perspective view showing the state in which an exterior member and so on are removed in order to explain a structure of a first display device of the virtual image display device.

As shown in FIG. 5, the first display device 100A can be recognized to include a projection see-through device 70 as an optical system for projection, and an image display device 80 for forming the video light. The projection see-through device 70 has a role of projecting the image formed by the first image forming main body section 105a to the eye of the observer as a virtual image. The projection see-through device 70 is provided with a light guide member 10 used for guiding the light and seeing things therethrough, a light transmissive member 50 for seeing things therethrough, and a projection lens for image formation. In other words, the first optical member 101a or the light guide device 20 is composed of the light guide member 10 and the light transmissive member 50, and the first image forming main body section 105a is composed of the image display device 80 and the projection lens 30.

Figure 6A:
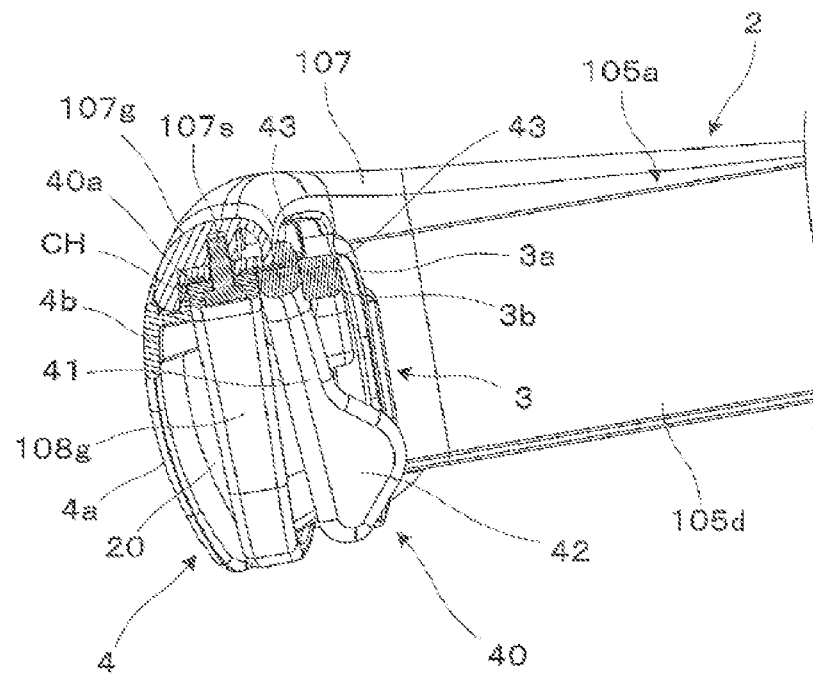
FIG. 6A is a diagram showing an AA cross-section of the virtual image display device shown in FIG. 2C.
Figure 7:
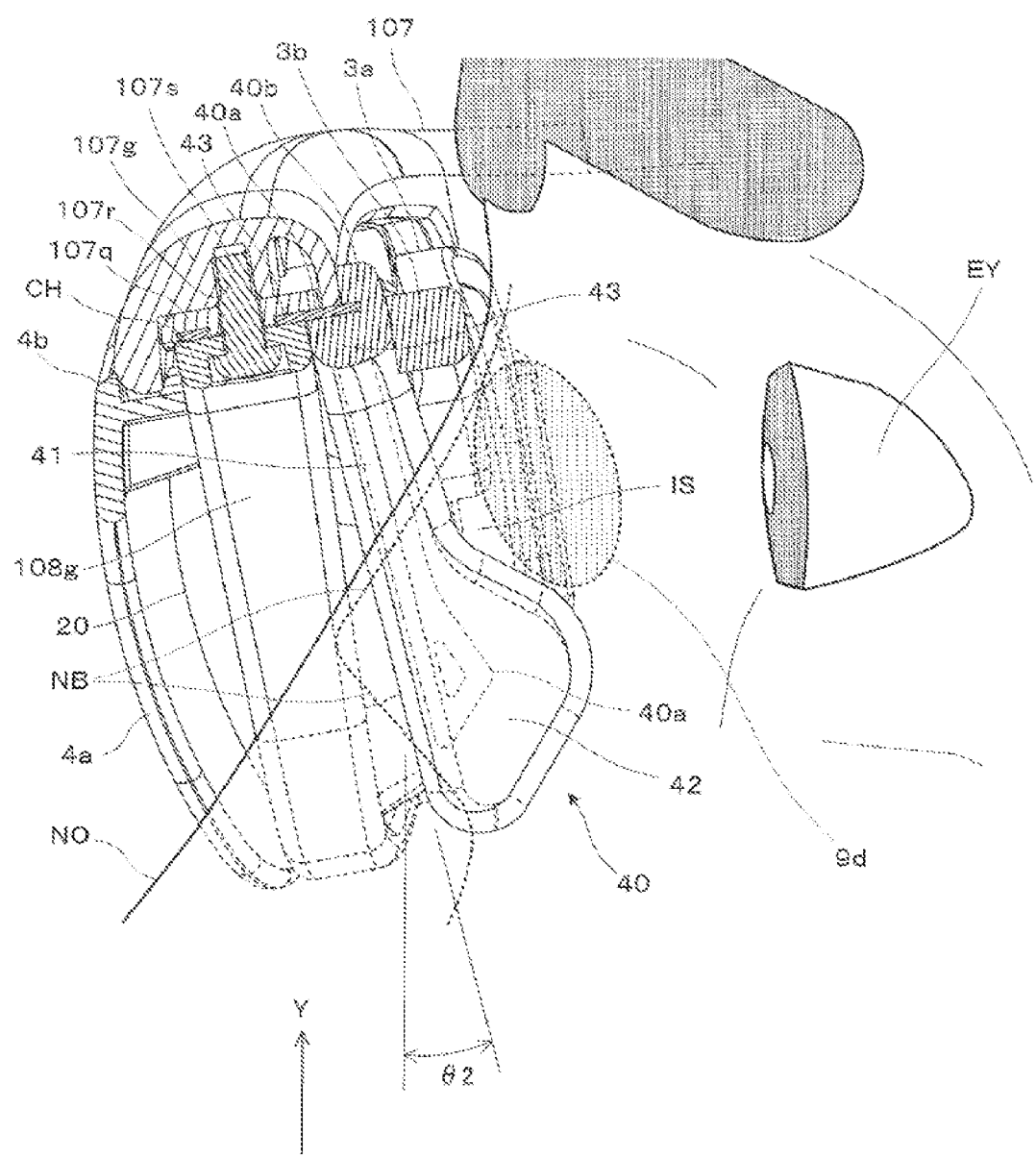
FIG. 7 is an enlarged cross-sectional view for explaining a mounting state by enlarging a part of FIG. 6A.

A nose support section 40 disposed additionally to the frame (the beam section) 107 and so on of the frame section 102 will hereinafter be explained with reference to FIGS. 6A, 7, and so on. The nose support section 40 is fixed to the frame 107, and has a role of supporting the frame section 102 by having contact with the nose of the observer. Specifically, it results that the frame section 102 is disposed in front of the face of the observer by the nose support section 40 supported by the nose and the pair of temple sections 104 supported by the ears. A part obtained by combining the frame section 102, the nose support section 40, and the temple sections 104 is similar to frames of a pair of glasses in appearance, and can achieve the mounting feeling similar to that of a pair of glasses.

The nose support section 40 is fixed by screwing to the central portion 107g of the front section 107a of the frame 107 constituting the upper side of the frame section 102, and extends downward. The nose support section 40 has a fixation section 43 in an upper central portion, a pair of length adjustment members 41 extending vertically, and pad sections 42 formed at the tips of the respective adjustment members 41. The fixation section 43 is formed as a part for stably fixing the nose support section 40 to the frame 107. A core metal 40a partially exposed in the fixation section 43 is sandwiched between the central portion 107g of the frame 107 and a top portion CH of the connection section (the connection area) 108g provided to the protector 108, and is fixed by being fastened by a screw 107s screwed into a screw hole 107r of the front section 107a together with the projector 108. The length adjustment members 41 have a role of adjusting the distance between the pad sections 42, and the height position and so on of the pad sections 42. The pair of length adjustment members 41 spread at an angle θ1 toward the tip side (see, e.g., FIG. 2C), and define the distance between the pair of pad sections 42. Further, the axes of the length adjustment members 41 each have a tip projecting toward the observer, and have a tilt of an angle θ2 with the vertical Z direction. The pad sections 42 are parts to have contact with the nose NO of the observer, and are arranged to spread flatly in directions roughly along the side surfaces of the nose NO so that the contact area with the nose NO can be maximized.

The nose support section 40 is provided with the core metal 40a as a metal plate having flexibility, and a resin section 40b for covering the core metal 40a. The core metal 40a is formed of a plastically-deformable metal material (e.g., SUS). Thus, the shape of the nose support section 40 can constantly be deformed by, for example, curving the length adjustment members 41 to thereby fit the nose support section 40 to the height and the shape of the nose of the observer. Specifically, by changing the angle θ1 to adjust the distance between the pair of pad sections 42, the fitting state of the nose NO of the observer with respect to the nose support section 40 can be adjusted. Further, by deforming the pad sections 42 in a twisted manner, the fitting feeling to the nose NO can also be improved. Further, in the pad sections 42 of the nose support section 40, the resin section 40b has a slight elasticity, and the pad sections 42 are allowed to make a microscopic displacement laterally due to the slight elasticity provided to the core metal 40a, and are therefore arranged to have soft contact with the nose NO of the observer, which improves the wearing feeling. By arranging that the shape and the contact state of the nose support section 40 can be adjusted due to, for example, the deformation of the length adjustment members 41 as described above, the height and the distance of the frame 107 or the light guide devices 20 with respect to the eyes EY can finely be tuned taking the mounting feeling into consideration. Therefore, it becomes possible to mount the virtual image display device 100 so as to suit the taste of the observer.

It should be noted that the nose support section 40 can also be replaced by loosing the screw 107s. Since there is a limitation in the adjustment with the length adjustment members 41, the adjustment range of the nose support section 40 can be enlarged by replacing the nose support section 40.

Since the pad sections 42 of the nose support section 40 are supported by the nasal bone NB of the nose NO of the observer with a sufficient largeness, the support of the light guide devices 20 can be made stable, and it is arranged that the burden on the nose NO is reduced. In other words, the nose support section 40 with the structure described above makes the mounting of the virtual image display device 100 relatively comfortable. It should be noted that the pad sections 42 of the nose support section 40 are supported at positions corresponding to the lower portion of the nasal bone NB to be arranged to avoid interference with eyeglasses nose pads 9d supported by an upper portion of the nasal bone NB near to the glabella, which enables the coexistence with the eyeglasses 9 provided with the eyeglasses nose pads 9d.

The auxiliary mounting member 3 fixed to the main body 2 so as to be detachably attached will hereinafter be explained with reference to FIGS. 3A through 3D. The auxiliary mounting member 3 is disposed in an inner space IS (see FIG. 4) formed between the frame section 102 or the frame (the beam section) 107 and the face of the observer. The auxiliary mounting member 3 is provided with an inner frame 3z having a frame shape corresponding to the contour obtained by combining the pair of optical members 101a, 101b. The inner frame 3z is formed of a resin material, and has an outer shape similar to a pair of eyeglasses. The inner frame 3z is provided with a pair of rim sections 3a each having a ring-like shape, and a bridge section 3b connecting both of the rim sections 3a to each other. The inner frame 3z has a bilaterally symmetric shape, and the bridge section 3b disposed in a central portion CR2 of the inner frame 3z is provided with a coupling section 3h of a snap-fit type to be fitted into the support section 8 provided to the protector 108. The coupling section 3h has a pair of projections 3e, and the tip of each of the projections 3e is provided with a claw 3f directed inward. The pair of claws 3f of the coupling section 3h engage with a pair of recessed sections 8v each having a groove shape and formed on the space PQ (see FIG. 1) side of the connection section (the connection area) 108g provided to the protector 108. Here, the pair of projections 3e respectively supporting the pair of claws 3f at the tips thereof have a flexibility due to the material, and are capable of disengaging the claws 3f from the recessed sections 8v by applying an appropriate stress to increase or decrease the lateral distance between both of the claws 3f. As a result, by aligning the coupling section 3h of the inner frame 3z with the support section 8 of the protector 108, and then pressing the bridge section 3b against the support section 8 side, the projections 3e of the coupling section 3h enter the space PQ, and both of the coupling section 3h and the support section 8 are fitted to each other so that the coupling section 3h pinches the support section 8, and thus, the inner frame 3z is fixed to the protector 108. In contrast, by pulling the bridge section 3b of the inner frame 3z so as to be separated from the support section 8, the coupling section 3h is disengaged from the support section 8, the fixation of the inner frame 3z is released, and thus, the inner frame 3z is separated from the protector 108. In other words, the inner frame 3z or the auxiliary mounting member 3 can freely be attached or detached by hand.

The auxiliary mounting member 3 or the inner frame 3z is relatively light weight, and is supported in the coupling section 3h in the central portion so as to be suspended by the support section 8 disposed in an upper space of the nose NO, and therefore, the auxiliary mounting member 3 can be fixed in a horizontally balanced and stable state. Further, since the inner frame 3z is disposed along the frame section 102, the sense of unity with the main body 2 is enhanced, and a sophisticated appearance can be ensured. Further, the coupling section 3h provided to the inner frame 3z fits into the contour of the bridge section 3b viewed from the front and the back, and is shaped along the connection section 108g of the frame 107, and is therefore made inconspicuous when viewed from the front of the main body 2. Further, even in the case of removing the auxiliary mounting member 3, the support section 8 provided to the connection section 108g is arranged to be inconspicuous in appearance.

Vision corrective lenses 3d are fixed to the respective rim sections 3a of the inner frame 3z. The vision corrective lens 3d can be made appropriate to the vision of the observer, and the observer can observe a sharp in-focus image due to the visual correction. It should be noted that in the case of the present embodiment, the virtual image formed by the first and second image forming main body sections 105a, 105b exists at an infinite distance, and the myopic observer can observe the in-focus image through the vision corrective lenses 3d and so on of the auxiliary mounting member 3. By preparing a plurality of auxiliary mounting members 3 and changing the auxiliary mounting members 3, it is possible to adapt the virtual image display device 100 to a plurality of observers different in vision from each other. In particular, since the distance between the optical axes of the pair of vision corrective lenses 3d is not limited to be adapted to the distance between the optical axes of the first and second image forming main body sections 105a, 105b, but can be adapted to the pupil distance of the user similarly to the eyeglasses when fixing the auxiliary mounting member 3 to the inner frame 3z. Therefore, it becomes possible to observe a good video and a good external image. By performing the visual correction in accordance with a personal prescription of a customer as described above, viewing of a video becomes safe. It should be noted that in general, it is desirable to set the difference between the optical axis distance of the pair of vision corrective lens 3d and the optical axis distance of the first and second image forming main body sections 105a, 105b to be equal to or smaller than 10 mm.

It is also possible to add a sunglasses function such as a dimming function or a coloring function to the vision corrective lenses 3d fixed to the inner frame 3z besides an ultraviolet protection function and a blue light protection function. The vision corrective lens 3d can be replaced with a light transmissive plate without the eyesight adjustment function. In this case, the auxiliary mounting member 3 functions as simple sunglasses and so on with respect to the external light. Further, a lens capable of dynamically adjusting the eyesight can also be adopted as the vision corrective lens 3d. In this case, even in the case in which a plurality of customers have the virtual image display device 100 in common, a good image can easily be observed.

Figure 8A:
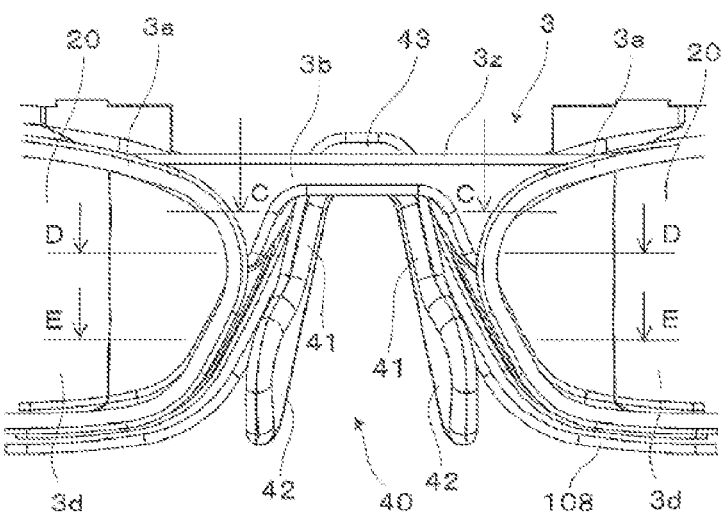
Figure 8B:
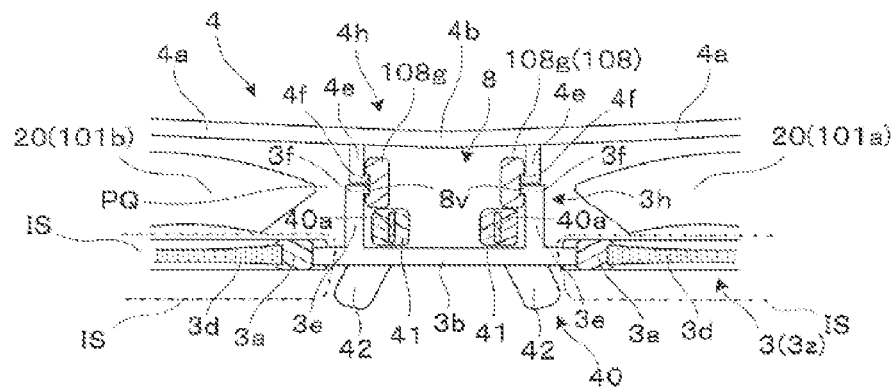
Figure 8C:
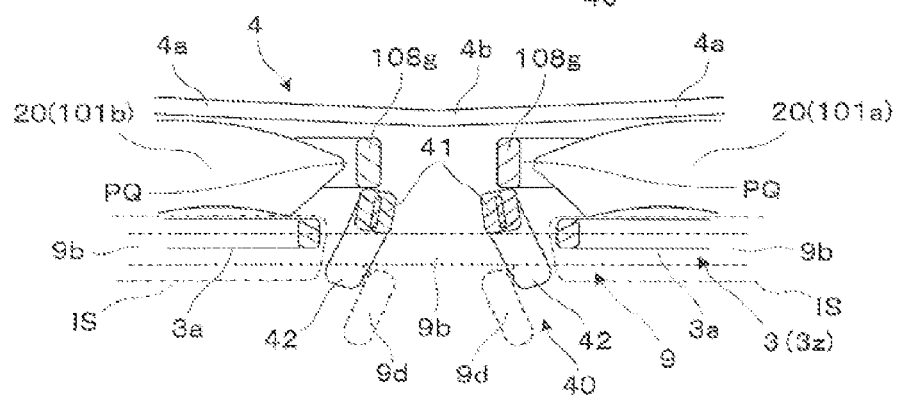

It should be noted that the auxiliary mounting member 3 is disposed on the inner side of the frame section 102. Therefore, a space larger than a certain size is formed between the optical members 101a, 101b and the eyes EY of the observer. Specifically, in the mounting state in which the virtual image display device 100 is worn, the inner space IS for disposing the auxiliary mounting member 3 is formed between the optical members 101a, 101b or the frame section 102 and the eyes EY of the observer (see FIG. 4). The inner space IS spreads along the optical members 101a, 101b to form a layer. It is possible to provide a room to the space to which the auxiliary mounting member 3 is inserted by ensuring the large inner space IS. However, on the other hand, if the distance between the eyes EY and the optical members 101a, 101b increases, the view angle of the virtual image display is decreased, and there arises a tendency that the optical members 101a, 101b are felt heavy. Therefore, regarding the inner space IS, it is desirable to decrease the thickness with respect to the Z direction, namely the front-back direction, as much as possible while ensuring the arrangement space for the auxiliary mounting member 3. As shown in FIG. 8C, it is also possible to use the inner space IS as the space for disposing the eyeglasses 9 instead of the auxiliary mounting member 3. In other words, the observer wearing the eyeglasses 9 is allowed to wear the virtual image display device 100 while wearing the eyeglasses 9 by detaching the auxiliary mounting member 3 from the virtual image display device 100. It should be noted that, as a result, the observer having removed the eyeglasses 9 wears the virtual image display device 100 attached with the auxiliary mounting member 3.

The cover member 4 as a shade fixed to the main body 2 so as to be detachably attached will hereinafter be explained with reference to FIGS. 2A, 8B, and so on. The cover member (the shade) 4 has a contour corresponding to a contour obtained by combining the pair of optical members 101a, 101b with each other, and covers both of the optical members 101a, 101b from the front. The cover member 4 is formed of, for example, a resin material having a light blocking property or a light absorption property, and is provided with a pair of lens sections 4a without the eyesight adjustment function, and an intermediate section 4b for supporting both of the lens sections 4a. The intermediate section 4b disposed at the central portion of the cover member 4 is provided with a coupling section 4h of the snap-fit type to be fitted to the support section 8 provided to the protector 108. The coupling section 4h has a pair of projections 4e, and the tip of each of the projections 4e is provided with a claw 4f directed inward. The pair of claws 4f of the coupling section 4h engage with a pair of recessed sections 8v each having a groove shape and formed on the space PQ side of the connection section 108g provided to the protector 108 similarly to the coupling section 3h of the auxiliary mounting member 3. Here, the pair of projections 4e respectively supporting the pair of claws 4f at the tips thereof have a flexibility, and are capable of disengaging the claws 4f from the recessed sections 8v by applying an appropriate stress to increase or decrease the lateral distance between both of the claws 4f. As a result, by aligning the coupling section 4h of the cover member 4 in a state before attached with the support section 8 of the protector 108, and then pressing the intermediate section 4b against the support section 8 side, the projections 4e of the coupling section 4h enter the space PQ, and both of the coupling section 4h and the support section 8 are fitted to each other so that the coupling section 4h pinches the support section 8, and thus, the cover member 4 is fixed to the protector 108. In contrast, by pulling the intermediate section 4b of the cover member 4 in a state after attached so as to be separated from the support section 8, the coupling section 4h is disengaged from the support section 8, the fixation of the cover member 4 is released, and thus, the cover member 4 is separated from the protector 108. Therefore, the cover member 4 can freely be attached and detached by hand.

In the case of attaching the cover member 4 to the main body 2, the external light can be blocked or dimmed, and thus, the observer can clearly observe the virtual image formed by the first and second image forming main body sections 105a, 105b. It should be noted that the cover member 4 is arranged to be able to be attached and detached independently of the auxiliary mounting member 3. In other words, it is possible to install only either one of the cover member 4 and the auxiliary mounting member 3 to the main body 2, and it is also possible to install both of the cover member 4 and the auxiliary mounting member 3 to the main body 2.

Figure 8D:
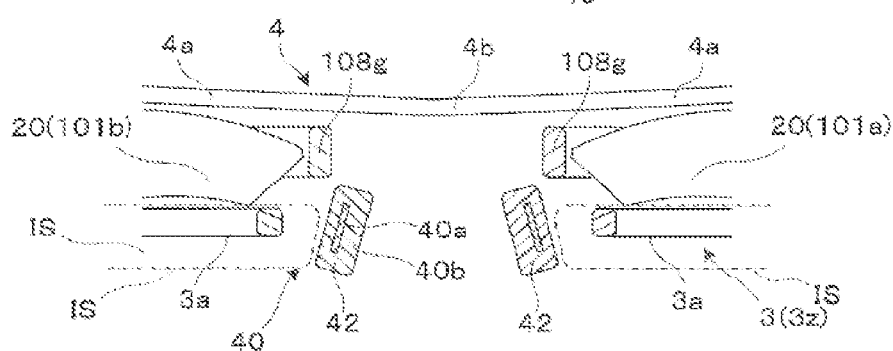

An arrangement relationship between the main body 2, the cover member 4, and the auxiliary mounting member 3 constituting the virtual image display device 100 shown in FIG. 1 will hereinafter be explained. As shown in FIG. 8B corresponding to the CC arrow cross-sectional view of FIG. 8A, the cover member 4 and the auxiliary mounting member 3 are fixed to the protector 108 of the main body 2 without interfering with each other, and the nose support section 40 is disposed so as to extend between the pair of rim sections 3a after passing through the front of the coupling section 3h provided to the auxiliary mounting member 3. As shown in FIG. 8C corresponding to the DD arrow cross-sectional view of FIG. 8A, the auxiliary mounting member 3 is disposed on the inner side of the light guide devices 20 or the optical members 101a, 101b so as to be adjacent to the light guide devices 20 or the optical members 101a, 101b. In other words, since the length adjustment members 41 are thin, it is arranged that the auxiliary mounting member 3 and the nose support section 40 do not interfere with each other even in the case of disposing the auxiliary mounting member 3. It should be noted that as already described, the eyeglasses 9 can be disposed in the position of the auxiliary mounting member 3 instead of the auxiliary mounting member 3 as indicated by the dotted line in the drawing. On this occasion, a bridge section 9a and a frame section 9b of the typical eyeglasses 9 are disposed on the inner side of the light guide devices 20 so as to be adjacent to the light guide devices 20. In particular, since the length adjustment members 41 are thin, and the pad sections 42 are disposed on the relatively lower side, it results that the interference between the length adjustment members 41 or the pad sections 42 and the eyeglasses nose pads 9d can easily be avoided. Further, the length adjustment members 41 and so on of the nose support section 40 are disposed on the front side or in front of the eyeglasses 9 and the eyeglasses nose pads 9d so as to avoid the interference with the eyeglasses 9 and the eyeglasses nose pads 9d. As shown in FIG. 8D corresponding to the EE arrow cross-sectional view of FIG. 8A, the pad sections 42 of the nose support section 40 are large in cross-sectional size, but are disposed on the inner side of the pair of rim sections 3a of, for example, the inner frame 3z with a sufficient distance.

Figure 6B:
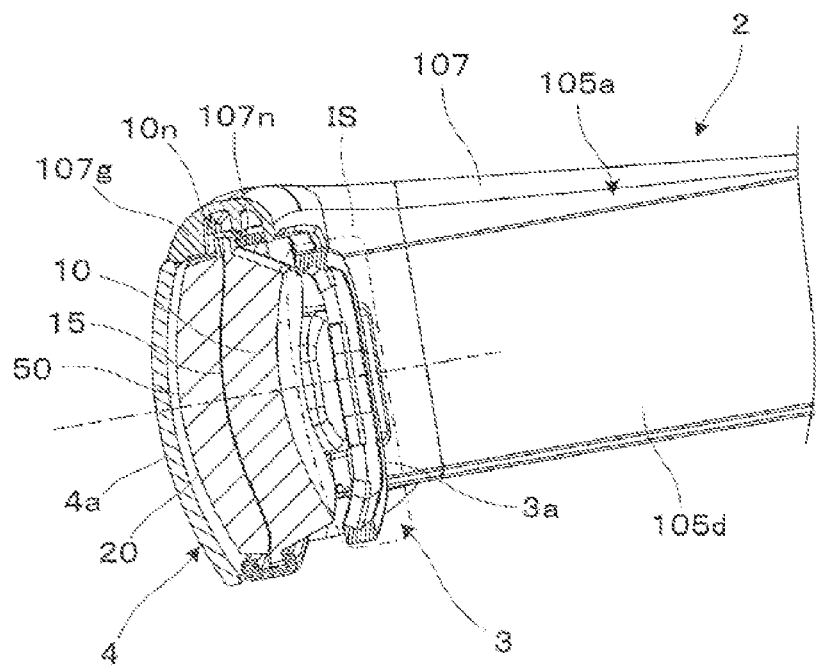
FIG. 6B is a diagram showing a BB cross-section of the virtual image display device.
Figure 9A:
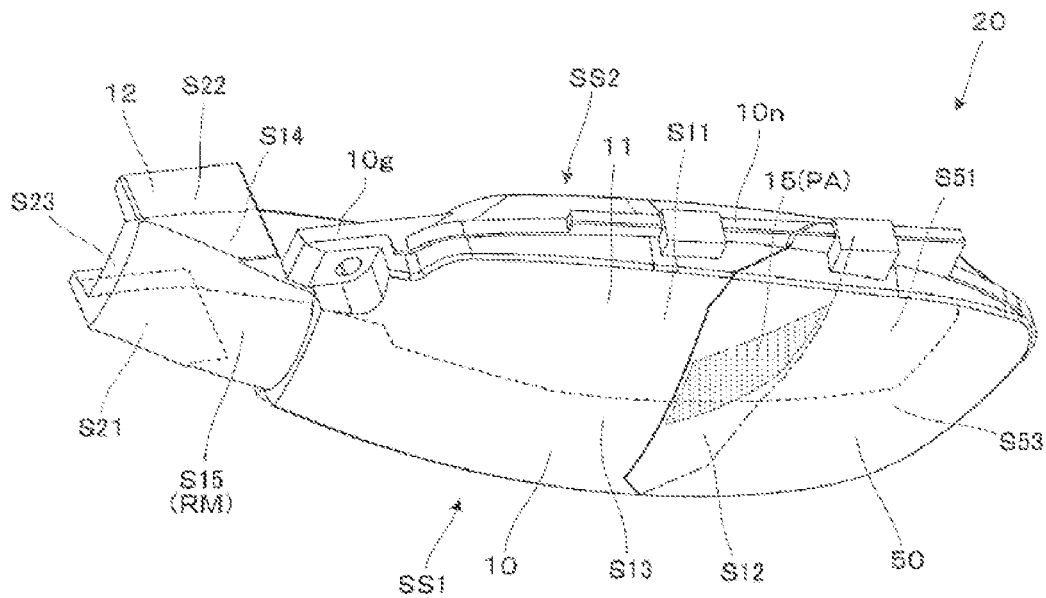
FIGS. 9A and 9B are perspective views for explaining an appearance of a light guide device or an optical member incorporated in the first display device.
Figure 9B:
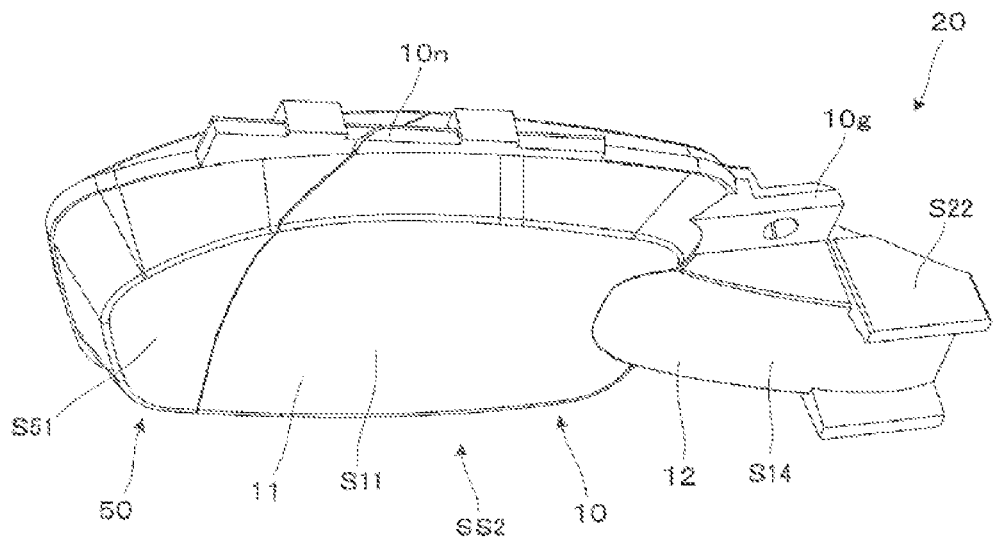

As shown in FIGS. 9A and 9B, the light guide member 10 and the light transmissive member 50 are fixed to each other to constitute the integrated light guide device 20. The light guide device 20 is a light transmissive member having an optical block shape or a prismatic shape for guiding the light of the video to the eye of the observer while internally reflecting the light. The main body portion of the light guide device 20 surrounded by a peripheral portion has an oval outline. Here, the light transmissive member 50 is disposed in the extending direction of the light guide member 10 so as to be connected to a first light guide portion 11 on the tip side, namely an exit side or a light emission side, of the light guide member 10, and is fixed to the first light guide portion 11 by bonding with an adhesive. The light guide device 20 obtained by combining the light guide member 10 and the light transmissive member 50 corresponds to the first optical member 101a in FIG. 1. On the upper side of the peripheral portion of the light guide device (the optical member) 20 near to the frame 107, there is formed a rib 10n to be fitted in a limiting section 107n disposed on a lower surface of the frame 107 as shown in FIG. 6B. Due to the existence of the first rib 10n, the displacement with respect to the depth direction (the Z direction) of the light guide device 20 is limited.

Installation of the first display device 100A to the frame 107 will hereinafter be explained with reference to FIGS. 10A, 10B, and so on. The projection lens 30 constituting the first image forming main body section 105a is directly fixed to the first fixation section 61f provided to a side end portion 65a of the frame 107 using an attachment section 39g formed to be embedded in a lens tube 39. When performing such fixation as described above, the alignment is achieved by a reverse surface 68f of the first fixation section 61f and the upper end surface of the attachment section 39g and so on having contact with each other, and detachable and reliable fixation becomes possible by screwing a screw 61t into the attachment section 39g via a screw hole 61s. On this occasion, a boss 39x provided to the lens tube 39 is fitted into a boss-receiving hole 61x of the frame 107 to thereby regulate the rotation of the lens tube 39, and thus the positioning with respect to the rotation is also performed. On the other hand, the light guide device 20 as the first optical member 101a is directly fixed to a second fixation section 61e provided to the side end portion 65a of the frame 107 using an attachment section 10g shaped like a projection provided to a neck portion of the light guide device 20. The attachment section 10g is erected in a portion of the light guide device 20 on the entrance side or the light entrance side, specifically in the periphery of the boundary between the first light guide portion 11 and a second light guide portion 12, so as to extend in the periphery. When performing such fixation as described above, the alignment is achieved by a stopper surface 68e provided to the anterior portion of the second fixation section 61e and a reverse surface 10k of the attachment section 10g having contact with each other, and detachable and reliable fixation becomes possible by screwing a screw 61v into a screw hole 61u through a screw hole 10u. It should be noted that the image display device 80 shown in FIG. 5 and so on is fixed so as to be fitted into a rear end of the lens tube 39 of the projection lens 30.

Figure 11:
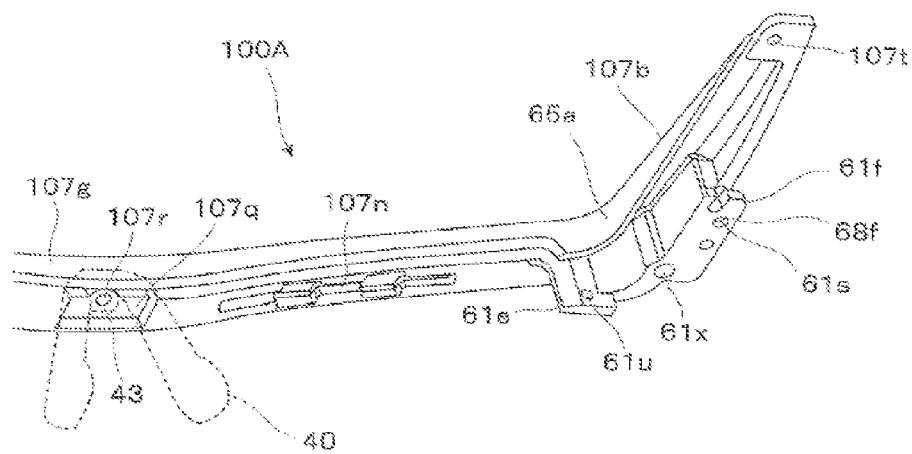
FIG. 11 is a perspective conceptual diagram for explaining a method of fixing the nose support section and so on to the frame.

The light guide device 20 is locked in a state of being positioned with respect to the projection lens 30 by fitting a tip portion 12j of the light guide member 10 on the second light guide portion 12 side into an engaging member 39a having a rectangular frame shape disposed and opened on the anterior end side of the lens tube 39 of the projection lens 30. In other words, when fixing the light guide member 10 provided to the light guide device 20 to the second fixation section 61e of the frame 107, the tip portion 12j on the second light guide portion 12 side is inserted into the engaging member 39a of the lens tube 39 so as to be fitted into the engaging member 39a. On this occasion, a side surface 12m of the tip portion 12j has contact with an inner surface 39m of the engaging member 39a to thereby achieve the alignment. Subsequently, as shown in FIGS. 6A and 7, the protector 108 is fixed to the frame 107 using the screw hole 107r provided to the central portion 107g of the frame 107 and a seat section 107q surrounding the screw hole 107r. On this occasion, as shown in FIGS. 7 and 11, the fixation section 43 of the nose support section 40 is held between the central portion 107g and the connection section 108g to thereby fix the nose support section 40. Through the process described above, an assembly of the frame 107, the projection see-through device 70, and the protector 108 can be obtained (see, e.g., FIGS. 3A through 3D).

Subsequently, as shown in FIGS. 2A, 2B, and so on, the outer member 105e of the exterior member 105d is fixed to the assembly of the frame 107 and the projection see-through device 70. The outer member 105e is fixed by fitting to the frame 107 or the projection lens 30, screwing to the attachment section 39g of the projection lens 30, and so on. On this occasion, it results that the fixation is performed by fitting the tip portions 108i, 108j of the protector 108, which has already been fixed to the frame 107, into the recessed section 105i provided to the outer member 105e. Then, an inner member 105f is fitted into the outer member 105e, and is then fixed to the outer member 105e by screwing. Thus, the projection lens 30 constituting the first image forming main body section 105a, a root side of the light guide device 20, the image display device 80, a part of each of the side surface sections 107b, 107c of the frame 107 are housed in a space defined between the inner member 105f and the outer member 105e.

Figure 10A:
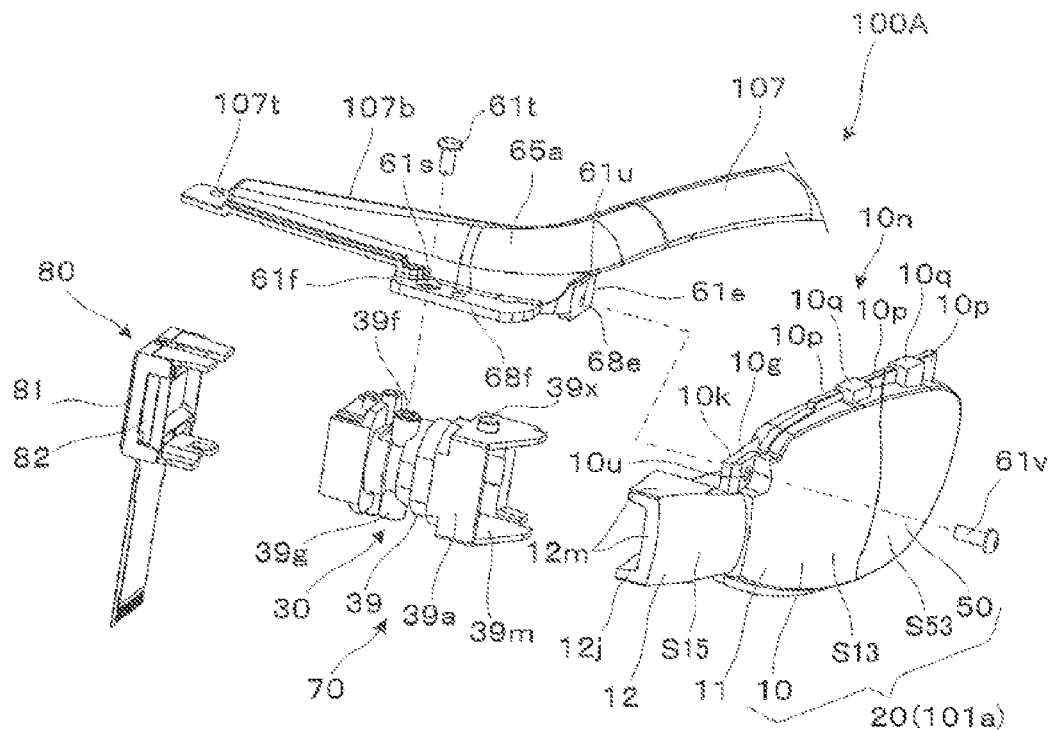
FIGS. 10A and 10B are exploded perspective views for explaining a method of fixing the light guide member and a projection lens of the virtual image display device to a frame.
Figure 10B:
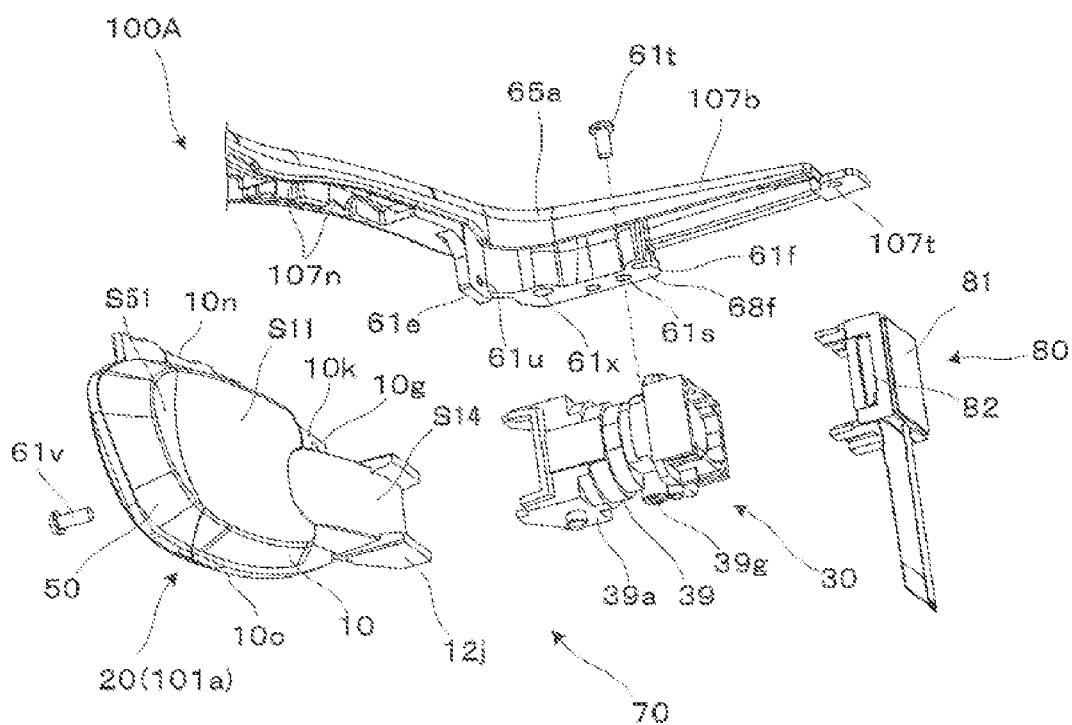

The temple sections 104 are respectively fixed to holes 107t disposed at the tips of the pair of side surface sections 107b, 107c provided to the frame 107 (see, e.g., FIG. 10A). Coupling sections between the temple sections 104 and the side surface sections 107b, 107c can each be provided with a hinge structure, and in this case, the temple sections 104 can be folded.

It should be noted that the second display device 100B shown in FIG. 1 has a structure similar to the structure of the first display device 100A, which is obtained by simply flipping the structure of the first display device 100A in a lateral direction, and therefore, the explanation of the structure, the function, assembling, and so on of the second display device 100B will be omitted.

Figure 12:
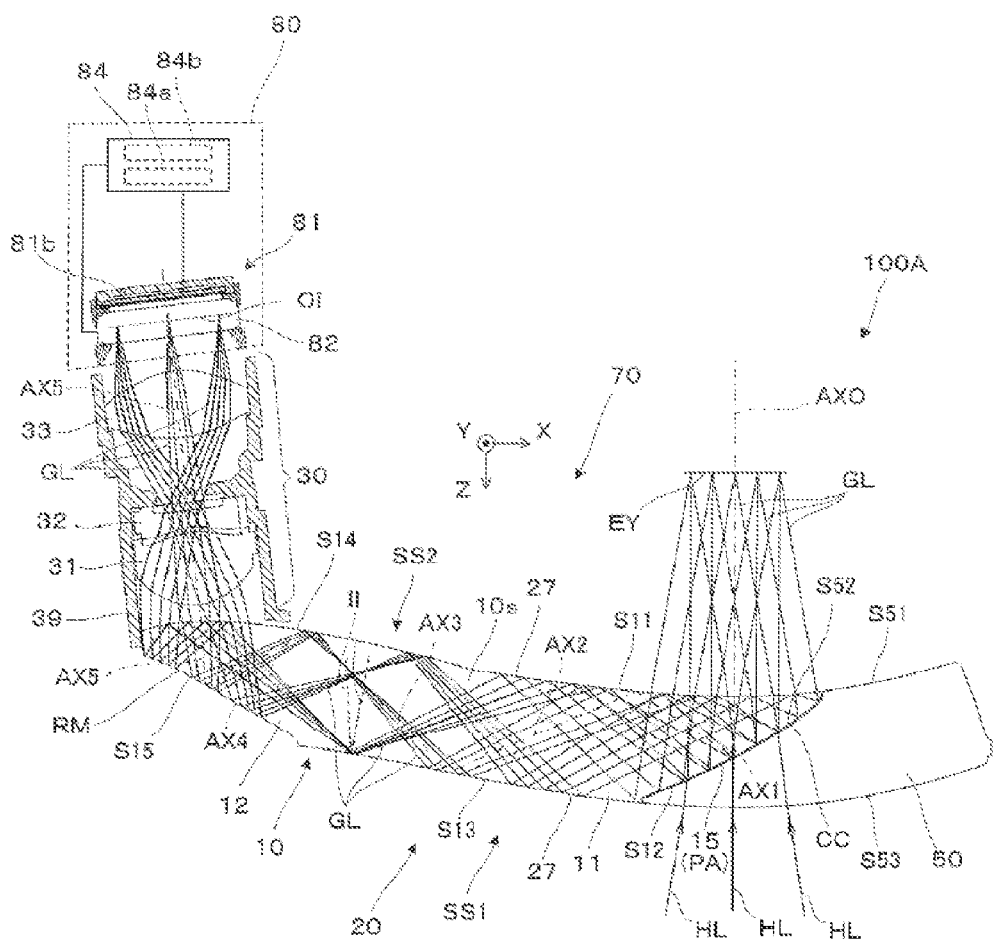
FIG. 12 is a cross-sectional view in a plane of symmetry with respect to a vertical direction of the first display device constituting the virtual image display device.

The details of the function, the action, and so on of the projection see-through device 70 and soon will be explained with reference to FIG. 12. The light guide member 10 as a part of the light guide device 20 of the projection see-through device 70 is a member having a circular arc shape curved along the face in a planar view. In the light guide member 10, the first light guide portion 11 is disposed on the central side near to the nose, namely the light exit side, and is provided with a first surface S11, a second surface S12, and a third surface S13 as side surfaces having an optical function, and the second light guide portion 12 is disposed on the peripheral side far from the nose, namely the light entrance side, and is provided with a fourth surface S14, and a fifth surface S15 as side surfaces having an optical function. Among these surfaces, the first surface S11 and the fourth surface S14 are continuously adjacent to each other, and the third surface S13 and the fifth surface S15 are continuously adjacent to each other. Further, the second surface S12 is disposed between the first surface S11 and the third surface S13, and the fourth surface S14 and the fifth surface S15 are adjacent to each other forming a large angle in between.

In the light guide member 10, the first surface S11 is a free-form surface having an exit side optical axis AXO parallel to the Z axis as a center axis, the second surface S12 is a free-form surface having an optical axis AX1, which is included in a reference plane (the cross section shown in the drawing) parallel to the X-Z plane, and is tilted with respect to the Z axis, as a center axis, and the third surface S13 is a free-form surface having the exit side optical axis AXO as the center axis. The fourth surface S14 is a free-form surface having an optical axis AX5 slightly tilted with respect to the bisector of a pair of optical axes AX3, AX4, which are included in the reference plane parallel to the X-Z plane, and are tilted with respect to the Z axis, as a center axis, and the fifth surface S15 is a free-form surface having the bisector of the pair of optical axes AX4, AX5, which are included in the reference plane parallel to the X-Z plane, and are tilted with respect to the Z axis, as a center axis. It should be noted that each of the first through fifth surfaces S11 through S15 described above has a shape symmetric about the reference plane (the cross section shown in the drawing) extending horizontally (or laterally), parallel to the X-Z plane, and through which the optical axes Ax1 through AX5 and so on pass, with respect to the vertical Y-axis direction.

A main body 10s of the light guide member 10 is formed of a resin material exhibiting a high light permeability in the visible range, and is formed by, for example, injecting thermoplastic resin into a metal mold, and then solidifying the thermoplastic resin. It should be noted that as the material of the main body 10s, cycloolefin polymer, and so on can be used. Although it is assumed that the main body 10s is an integral molding part, the light guide member 10 can separately be recognized as the first light guide portion 11 and the second light guide portion 12. The first light guide portion 11 enables light guide and emission of the video light GL, and at the same time makes it possible to see through the external light HL. The second light guide portion 12 enables input and light guide of the video light GL.

In the first light guide portion 11, the first surface S11 functions as a refracting surface for emitting the video light GL outside the first light guide portion 11, and at the same time, functions as a totally reflecting surface for totally reflecting the video light GL on the inner surface side. The first surface S11 is a surface disposed in front of the eye EY, and has a concave shape to the observer. It should be noted that the first surface S11 is a surface formed of a hard coat layer 27 provided to the surface of the main body 10s.

The second surface S12 is a surface of the main body 10s, and is attached with a half mirror layer 15 formed on the surface. The half mirror layer 15 is a reflecting film (i.e., a semi-transmissive reflecting film) having a light permeability. The half mirror layer (the semi-transmissive reflecting film) 15 is formed in a partial area PA obtained by narrowing the second surface S12 with respect to the vertical direction mainly along the Y axis instead of the entire second surface S12 (see, FIG. 9A). The half mirror layer 15 is formed by depositing a metal reflecting film or a dielectric multilayer film on the partial area PA in a foundation surface of the main body 10s. The reflectance of the half mirror layer 15 with respect to the video light GL is set to be no lower than 10% and no higher than 50% in the assumed incident angle range of the video light GL from the viewpoint of making the see-through observation of the external light HL easy. The reflectance of the half mirror layer 15 with respect to the video light GL in a specific example is set to, for example, 20%, and the transmittance with respect to the video light GL is set to, for example, 80%.

The third surface S13 functions as a totally reflecting surface for totally reflecting the video light GL on the inner surface side. The third surface S13 is a surface disposed in front of the eye EY, and forms a concave shape to the observer similarly to the first surface S11, and the diopter scale is set to roughly zero when viewing the external light HL through the first surface S11 and the third surface S13. It should be noted that the third surface S13 is a surface formed of the hard coat layer 27 provided to the surface of the main body 10s.

In the second light guide portion 12, the fourth surface S14 functions as a totally reflecting surface for totally reflecting the video light GL on the inner surface side. The fourth surface S14 also functions as a refracting surface for inputting the video light GL into the second light guide portion 12. It should be noted that the fourth surface S14 is a surface formed of the hard coat layer 27 provided to the surface of the main body 10s.

In the second light guide portion 12, the fifth surface S15 is formed by depositing a light reflecting film RM formed of an inorganic material on a surface of the main body 10s, and functions as a reflecting surface.

As is already described, the light transmissive member 50 is fixed integrally with the light guide member 10 to form the single light guide device 20. The light transmissive member 50 is a member (an auxiliary optical block) for assisting a see-through function of the light guide member 10, and has a first transmissive surface S51, a second transmissive surface S52, and a third transmissive surface S53 as side surfaces having an optical function. Here, the second transmissive surface S52 is disposed between the first transmissive surface S51 and the third transmissive surface S53. The first transmissive surface S51 is located on a curved surface obtained by extending the first surface S11 of the light guide member 10, the second transmissive surface S52 is a curved surface bonded to the second surface S12 with an adhesive layer CC to be integrated with the second surface S12, and the third transmissive surface S53 is located on a curved surface obtained by extending the third surface S13 of the light guide member 10. Among these surfaces, the second transmissive surface S52 and the second surface S12 of the light guide member 10 are integrated by bonding via a thin adhesive layer CC, and therefore have shapes with roughly the same curvature.

The light transmissive member (the auxiliary optical block) 50 exhibits high light permeability in the visible range, and the main body section of the light transmissive member 50 is formed of a thermoplastic resin material having roughly the same refractive index as that of the main body 10s of the light guide member 10. It should be noted that the light transmissive member 50 is formed by bonding the main body portion to the main body 10s of the light guide member 10, and then the deposition of the hard coat is performed together with the main body 10s in the bonded state. In other words, the light transmissive member 50 is provided with the hard coat layer 27 formed on a surface of the main body portion similarly to the light guide member 10. The first transmissive surface S51 and the third transmissive surface S53 are each a surface formed of the hard coat layer 27 provided to the surface of the main body portion.

The image display device 80 has an illumination device 81 for emitting illumination light, a video display element 82 as a transmissive spatial light modulation device, and a drive control section 84 for controlling the actions of the illumination device 81 and the video display element 82.

The illumination device 81 of the image display device 80 has a light source (not shown) for generating light including light components of three colors of red, green, and blue, and a backlight light guide section 81b for diffusing the light from the light source to form a light beam having a rectangular cross-section. The video display element 82 is a video element formed of, for example, liquid crystal display device, and spatially modulates the illumination light from the illumination device 81 to form the image light to be the display object such as a moving image. The drive control section 84 is provided with a light source drive circuit 84a and a liquid crystal drive circuit 84b. The light source drive circuit 84a supplies the illumination device 81 with electricity to thereby make it emit the illumination light with stable luminance. The liquid crystal drive circuit 84b outputs an image signal or a drive signal to the video display element (the video element) 82 to thereby form the color video light or the color image light to bean origin of a moving image or a still image in the form of a transmittance pattern. It should be noted that it is possible to provide an image processing function to the liquid crystal drive circuit 84b, and it is also possible to provide the image processing function to an external control circuit.

Hereinafter, a light path of the video light GL and soon in the virtual image display device 100 will be explained. The video light GL emitted from the video display element (the video element) 82 enters the fourth surface S14 having a positive refractive power (the power of the reflecting surface will hereinafter be expressed by being replaced with a refractive surface) and provided to the light guide member 10 while being converged by the projection lens 30.

The video light GL having passed through the fourth surface S14 of the light guide member 10 proceeds while being converged, then is reflected by the fifth surface S15 having a relatively weak positive refractive power when passing through the second light guide portion 12, and then enters the fourth surface S14 again from the inner side, and is then reflected while receiving a positive refractive power.

The video light GL having been reflected by the fourth surface S14 of the second light guide portion 12 enters the third surface S13 having a relatively weak positive refractive power and is then totally reflected in the first light guide portion 11, and then enters the first surface S11 having a relatively weak negative refractive power and is then totally reflected. It should be noted that the video light GL forms an intermediate image in the light guide member 10 before and after passing through the third surface S13. An image plane II of the intermediate image corresponds to an image plane OI of the video display element 82.

The video light GL having been totally reflected by the first surface S11 enters the second surface S12. However, the video light GL in particular having entered the half mirror layer 15 is partially reflected by the half mirror layer 15 while being partially transmitted through the half mirror layer 15, and then enters the first surface S11 again and is transmitted. It should be noted that the half mirror layer 15 acts as a device having a relatively strong positive refractive power to the video light GL reflected here. Further, the first surface S11 acts as a device having a negative refractive power to the video light GL passing therethrough.

The video light GL having passed through the first surface S11 enters the pupil of the eye EY of the observer or an equivalent position thereof as a roughly parallel light beam. Therefore, it results that the observer observes the image formed on the video display element (the video element) 82 by the video light GL as a virtual image.

On the other hand, a component of the external light HL entering the −X side of the second surface S12 of the light guide member 10 passes through the third surface S13 and the first surface S11 of the first light guide portion 11. On this occasion, the positive refractive power and the negative refractive power cancel out each other, and at the same time, aberration is corrected. Therefore, it results that the observer observes the external image with reduced distortion through the light guide member 10. Similarly, in a component of the external light HL entering the +X side of the second surface S12 of the light guide member 10, namely a component having entered the light transmissive member 50, the positive refractive power and the negative refractive power cancel out each other, and at the same time, aberration is corrected when passing through the third transmissive surface S53 and the first transmissive surface S51 provided to the light transmissive member 50. Therefore, it results that the observer observes the external image with reduced distortion through the light transmissive member 50. Further, in a component of the external light HL entering the light transmissive member 50 corresponding to the second surface S12 of the light guide member 10, the positive refractive power and the negative refractive power cancel out each other, and at the same time, aberration is corrected when passing through the third transmissive surface S53 and the first transmissive surface S51. Therefore, it results that the observer observes the external image with reduced distortion through the light transmissive member 50. It should be noted that the second surface S12 of the light guide member 10 and the second transmissive surface S52 of the light transmissive member 50 have roughly the same curved surface shapes and roughly the same refractive indexes, and the gap between the second surface S12 and the second transmissive surface S52 is filled with an adhesive layer CC with roughly the same refractive index. Therefore, the second surface S12 of the light guide member 10 and the second transmissive surface S52 of the light transmissive member 50 do not act on the external light HL as a substantial refracting surface.

It should be noted that since the external light HL having entered the half mirror layer 15 is partially reflected while being partially transmitted through the half mirror layer 15, the external light HL from the direction corresponding to the half mirror layer 15 is weakened in accordance with the transmittance of the half mirror layer 15. On the other hand, since the video light GL is input from the direction corresponding to the half mirror layer 15, it results that the observer observes the external image together with the image formed on the video display element (the video element) 82 in the direction of the half mirror layer 15.

A part of the video light GL, which has propagated in the light guide member 10 and has entered the second surface S12, but has not been reflected by the half mirror layer 15, enters the light transmissive member 50, but is prevented by an antireflection section not shown provided to the light transmissive member 50 from returning to the light guide member 10. In other words, the video light GL having passed through the second surface S12 is prevented from being returned on the light path to become the stray light. Further, the external light HL having been input from the light transmissive member 50 side and reflected by the half mirror layer 15 is returned to the light transmissive member 50, but is prevented by the antireflection section not shown, described above, and provided to the light transmissive member 50 from being emitted toward the light guide member 10. In other words, the external light HL having been reflected by the half mirror layer 15 is prevented from being returned on the light path to become the stray light.

As is obvious from the explanation described above, according to the virtual image display device 100 of the present embodiment, since the frame section 102 has the support section 8 for detachably fixing the auxiliary mounting member 3, which is disposed adjacent to the optical members 101a, 101b, on the observer side of the optical members 101a, 101b, by providing a variety of functions such as an optical function to the auxiliary mounting member 3, the usefulness of the virtual image display device 100 can be enhanced. Specifically, in the case of, for example, providing the auxiliary mounting member 3 with a diopter correction function or a vision correction function, it is possible for any observers with a variety of levels of vision to observe the image obtained by the video display element (the video element) 82 in a good condition without blur without using eyeglasses.

Although the invention is hereinabove explained along the embodiment, the invention is not limited to the embodiment described above, but can be put into practice in various forms within the scope or the spirit of the invention, and the following modifications, for example, are also possible.

For example, the inner frame 3z and the vision corrective lens 3d are not limited to the separated bodies, but can also be integrated with each other.

The coupling sections 3h, 4h for fixing the auxiliary mounting member 3 to the main body 2 are not limited to the snap-fit type, but a variety of methods such as clipping using a spring can also be used instead. In the case of, for example, personal use, since the replacement of the auxiliary mounting member 3 is not so frequent, a structure of screwing the auxiliary mounting member 3 to the frame section 102 can also be adopted. Further, the auxiliary mounting member 3 can be supported by the holding section such as the groove provided to the protector 108 or the frame 107, or by engaging the fixation member such as a hook provided to the auxiliary mounting member 3 with the opposed place of the protector 108 or the frame 107. It should be noted that the cover member 4 can be made to be able to be detachably attached to the protector 108 and so on using a variety of methods similarly to the auxiliary mounting member 3.

The cover member 4 is not essential, and it is also possible to make the support section 8 or the recessed section 8v provided to the connection section 108g dedicated to the auxiliary mounting member 3. Alternatively, it is also possible to individually dispose the support section for the cover member 4 with varying the height in the connection section 108g.

The support section 8 for the auxiliary mounting member 3 can also be provided to the frame 107 instead of the protector 108. In this case, the support section 8 is provided to the central portion 107g or a portion extending downward from the central portion 107g.

The frame section 102 can be made to have a variety of shapes capable of bridging the projection lens 30 and the light guide device 20 with each other besides the shape exemplified in the embodiment, or the shape similar to eyeglasses frames. It is also possible to adopt a shape in which, for example, the protector 108 is formed only of the connection section 108g. Further, by increasing the rigidity of the protector 108, it is also possible to provide the function of the holding section or the support section of holding the first and second image forming main body sections 105a, 105b to the protector 108 instead of the frame 107. In the case of providing the function of the holding section or the support section of holding the light guide device 20 and so on to the protector 108 as described above, the protector 108 alone functions as the frame section for supporting. On the other hand, the protector 108 can be eliminated, and in this case, the frame 107 functions as the frame section for supporting by itself. Further, the frame 107 is not limited to one supported by the ears using the temple sections 104, but can also be a holding member, which is supported by a member having a band shape or a headgear shape to be mounted on the head of the observer to thereby hold the light guide device 20 and so on.

The nose support section 40 can be made to be a portion projected from the protector 108, or can be made to be a separated member to be detachably fixed to the protector 108.

Although in the embodiment described above, the frame 107 and the projection lens 30 are separated from each other, and the projection lens 30 is fixed to the frame 107 by screwing, it is also possible to form the lens tube 39 of the projection lens 30 and the frame 107 integrally with each other. As a method of integrally forming the lens tube 39 with the frame 107, there can be cited methods such as outsert molding, and caving out of the lens tube after die-cast integral molding.

The light guide device 20 or the projection lens 30 can be fixed to the frame 107 by a variety of methods besides the fastening by screwing.

Although in the embodiment described above, the projection lens 30 is disposed on the light entrance side of the light guide member 10, it is possible to eliminate the projection lens 30, and provide an imaging function to the light guide member 10 itself. Further, it is also possible to dispose another light guide member 10 having the imaging function instead of the projection lens 30.

Although in the embodiment described above, the engaging member 39a with the light guide device 20 is provided to the lens tube 39 of the projection lens 30, it is possible to dispose an engaging member to be fitted into the lens tube 39 on the light guide 20 side so as to sandwich, for example, the lens tube 39.

Although in the present embodiment, it is assumed that the half mirror layer (the semi-transmissive reflecting film) 15 is formed in the horizontally long rectangular area, the contour of the half mirror layer 15 can arbitrarily be changed in accordance with the specifications such as the purpose. Further, the transmittance and the reflectance of the half mirror layer 15 can also be changed depending on the usage and so on.

Although in the embodiment described above, it is assumed that the half mirror layer 15 is a simple semi-transmissive film (e.g., a metal reflecting film, or a dielectric multilayer film), the half mirror layer 15 can be replaced with a hologram element on a flat surface or a curved surface.

Although in the embodiment described above, the distribution of the display luminance in the video display element 82 is not particularly controlled, in the case in which, for example, a luminance difference occurs by position, the distribution of the display luminance can unequally be controlled.

Although in the embodiment described above, the video display element 82 formed of the transmissive liquid crystal display device and so on is used as the image display device 80, the image display device 80 is not limited to the video display element 82 formed of the transmissive liquid crystal display device and so on, but various types of devices can be used as the image display device 80. For example, the configuration using the reflective liquid crystal display device is also possible, and it is also possible to use the digital micromirror Device™ and so on instead of the video display element 82 formed of the liquid crystal display device and so on. Further, it is also possible to use a light-emitting element represented by, for example, an LED array and an organic EL (OLED) as the image display device 80.

Although in the embodiment described above, the image display device 80 formed of the transmissive liquid crystal display device and so on is used, a scanning type image display device can also be used instead thereof.

Figure 13:
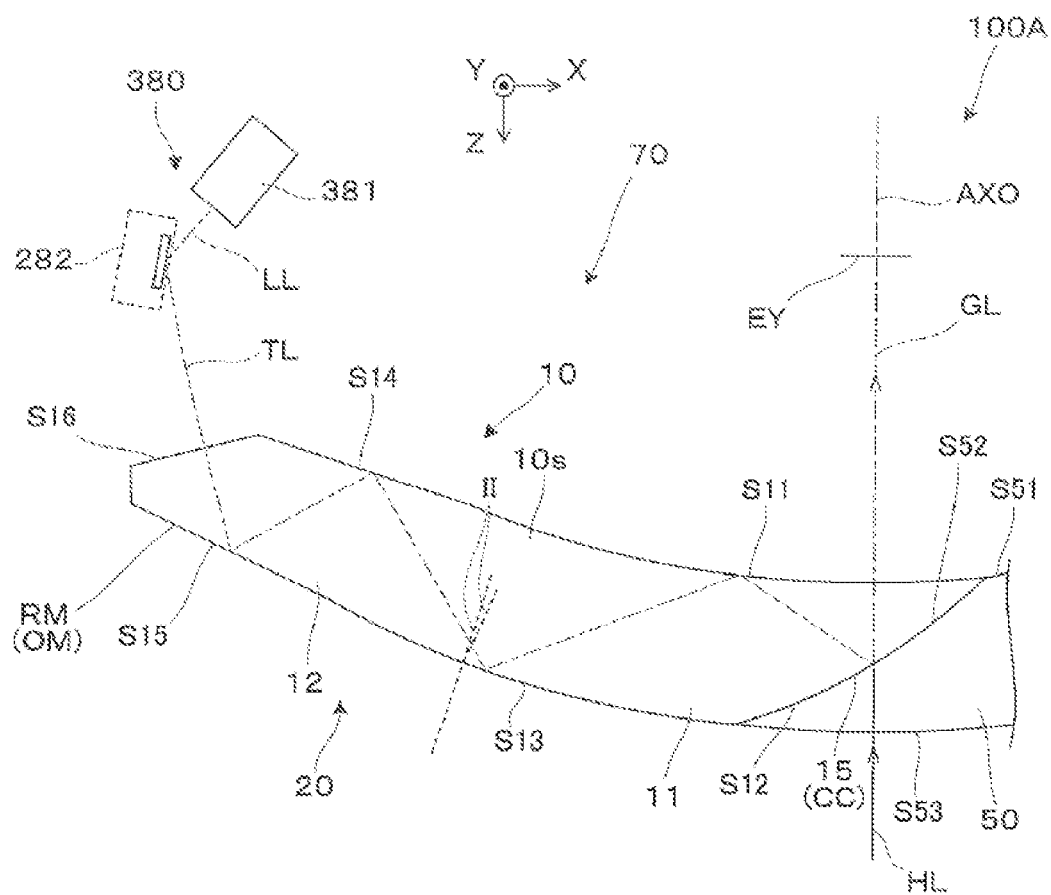
FIG. 13 is a diagram for explaining a virtual image display device according to a modified example.

Specifically, as shown in FIG. 13, the first display device 100A as the virtual image display device is provided with the light guide device 20 and an image display device 380. The light guide device 20 is the same as described above, and the explanation thereof will be omitted here. On the other hand, the image display device 380 has a signal light forming section 381 and a scanning optical system 282. The signal light forming section 381 is also provided with a light source, and forms and then emits the signal light LL. The scanning optical system 282 controls the light path by changing the posture in accordance with the modulation of the signal light forming section 381 to thereby input the scanning light TL to be the video light GL into the light guide device 20, and at the same time, scan the entire partial area of the second surface S12 in which the half mirror layer 15 is formed with the scanning light TL. The action of the first display device 100A shown in the drawing will be explained. The signal light LL emitted from the signal light forming section GG of the image display device 380 enters the scanning optical system 282. The scanning optical system 282 emits the signal light LL toward the light guide device 20 as the scanning light TL. The light guide device 20 guides the scanning light TL input from the sixth surface S16 inside by the total reflection and so on in the first through fifth surfaces S11 through S15, and makes the scanning light TL reach the half mirror layer 15. On this occasion, the surface of the half mirror layer 15 is scanned with the scanning light TL to thereby form the virtual image by the image light GL as the locus of the scanning light TL, and the wearer captures the virtual image with the eye EY to thereby recognize the image. It should be noted that in the case shown in the drawing, the sixth surface S16 as the plane of incidence of light of the surfaces of the light guide device 20 is made to be a plane perpendicular to the optical axis of the scanning light TL. Further, each of the fifth surface S15 and the fourth surface S14 is also made to be a plane.

Although in the explanation described above, the virtual image display device 100 provided with the pair of display devices 100A, 100B is explained, a configuration with a single display device can also be adopted. Specifically, it is also possible to adopt the configuration of providing the projection see-through device 70 and the image display device 80 corresponding to either one of the right and left eyes to thereby view the image with a single eye instead of providing the set of the projection see-through device 70 and the image display device 80 corresponding to each of the right and left eyes. In this case, the frame 107 and the temple sections 104 are made to have a shape to be disposed in a bilaterally symmetric manner without modification on the shapes shown in, for example, FIG. 1. Although the auxiliary mounting member 3 and the cover member 4 can be disposed only in one side in accordance with the projection see-through device 70 and so on, it is natural for the auxiliary mounting member 3 and the cover member 4 to be disposed so as to correspond to the both eyes.

Although in the explanation described above, the distance in the X direction between the pair of display devices 100A, 100B is not explained, the distance between the both display devices 100A, 100B is not limited to a fixed distance, but can be adjusted using a mechanical mechanism and so on. Specifically, by providing an expansion mechanism and so on to the frame 107, the distance in the X direction between the both display devices 100A, 100B can be adjusted in accordance with the pupil distance and so on of the wearer.

Although in the embodiment described above, it is assumed that in the first surface S11 and the third surface S13 of the light guide member 10, the video light is totally reflected by the interface with air to thereby guide the video light without providing a mirror or a half mirror on the surfaces, the total reflection in the virtual image display device 100 according to the invention should include the reflection performed by the mirror coat or the half mirror film formed on the entire or a part of each of the first surface S11 and the third surface S13. For example, there is also included the case in which the mirror coat or the like is applied to the entire or a part of each of the first surface S11 and the third surface S13 with the incident angle of the video light fulfilling the total reflection condition, and thus, the substantially whole video light is reflected. Further, it is also possible to coat the entire or a part of each of the first surface S11 and the third surface S13 with a mirror having some transmissive property providing the video light with sufficient brightness can be obtained.

Although in the above explanation, the light guide member 10 or the like extends in the lateral direction along which the eyes EY are arranged, it is possible to arrange that the light guide member 10 extends in a vertical direction. In this case, the light guide member 10 is supported in, for example, an upper part in a cantilever state.

The entire disclosure of Japanese Patent Application No. 2013-047618, filed Mar. 11, 2013 is expressly incorporated by reference herein.

What is claimed is:

1. A virtual image display device comprising:
a video element;
an optical member adapted to direct light from the video element toward an eye of an observer to make an image be recognized; and
a frame section adapted to support the video element and the optical member so that the optical member is disposed in front of the eye of the observer,
wherein
the frame section includes a support section adapted to detachably fix an auxiliary mounting member to be disposed on the observer side of the optical member, and
the optical member includes a light guide device having an optical block shape having a light permeability adapted to guide video light from a video display element as the video element to the eye of the observer while internally reflecting the video light.

2. The virtual image display device according to claim 1, wherein
the auxiliary mounting member is disposed on the observer side of the optical member so as to be adjacent to the optical member.

3. The virtual image display device according to claim 1, wherein
the support section is disposed in a space corresponding to an upper part of a nose.

4. The virtual image display device according to claim 1, wherein
the frame section forms an inner space used for disposing eyeglasses instead of the auxiliary mounting member in a mounting state.

5. The virtual image display device according to claim 1, further comprising:
a pair of temple sections extending from the frame section, and supported by ears; and
a nose support section having contact with a nose to support the frame section.

6. The virtual image display device according to claim 1, wherein
the support section detachably fixes a cover member adapted to cover an outside of the optical member.

7. The virtual image display device according to claim 1, wherein
the light guide device includes
a light guide member adapted to guide the video light, and enable see-through of external light, and
a light transmissive member connected to the light guide member, and adapted to assist a see-through function for the external light.

8. The virtual image display device according to claim 1, wherein
the video element emits signal light scanned two-dimensionally, and
the optical member reflects the light from the video display element to guide the light to the eye of the observer.

9. The virtual image display device according to claim 1, wherein
the auxiliary mounting member includes an inner frame corresponding to a contour of the optical member.

10. The virtual image display device according to claim 9, wherein
the auxiliary mounting member includes a vision corrective lens fixed to the inner frame.

11. The virtual image display device according to claim 1, wherein
the support section is disposed in a central portion of the frame section in a lateral direction, and is capable of supporting a central portion of the auxiliary mounting member.

12. The virtual image display device according to claim 11, wherein
the auxiliary mounting member includes an inner frame having an eyeglasses-like outer shape having a pair of rim sections each having a ring-like shape and connected to each other by a bridge section, and
the support section supports a coupling section provided to the bridge section.

13. The virtual image display device according to claim 12, wherein
the support section includes a pair of spaces to which a pair of projections extending from the bridge section are inserted, and a pair of recessed sections to which claws disposed respectively at tips of the pair of projections are fitted.

14. The virtual image display device according to claim 1, wherein
the frame section includes a frame adapted to support the optical member, and a protector fixed to the frame, and adapted to protect at least a part of the optical member.

15. The virtual image display device according to claim 14, wherein
the support section is formed in a connection area between the frame and the protector.

16. The virtual image display device according to claim 14, wherein
the frame includes a front section extending linearly, and
the protector is disposed below the frame across the optical member, and includes a connection section in a central portion, the connection section having an inverted V shape and being connected to a central portion of the front section.

17. A virtual image display device comprising:
a video element;
an optical member adapted to direct light from the video element toward an eye of an observer to make an image be recognized; and
a frame section adapted to support the video element and the optical member so that the optical member is disposed in front of the eye of the observer,
wherein
the frame section includes a support section adapted to detachably fix an auxiliary mounting member to be disposed on the observer side of the optical member,
the video element emits signal light scanned two-dimensionally, and
the optical member reflects the light from the video element to guide the light to the eye of the observer.

* * * * *